(12) United States Patent  
Garber

(10) Patent No.: US 6,560,616 B1  
(45) Date of Patent: *May 6, 2003

(54) ROBUST MODIFICATION OF PERSISTENT OBJECTS WHILE PRESERVING FORMATTING AND OTHER ATTRIBUTES

(75) Inventor: David G. Garber, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,330

(22) Filed: May 5, 2000

Related U.S. Application Data

(63) Continuation-in-part of application No. 09/282,027, filed on Mar. 26, 1999, now Pat. No. 6,347,323.

(51) Int. Cl.[7] .......................... G06F 17/30; G06F 12/00
(52) U.S. Cl. ...................... 707/203; 707/103 R; 707/8; 707/100; 707/101; 707/102
(58) Field of Search ............................ 707/203, 8, 100, 707/101, 102, 103 R

(56) References Cited

U.S. PATENT DOCUMENTS

| | | | | | |
|---|---|---|---|---|---|
| 4,558,416 | A | * | 12/1985 | Schmidt et al. ............. | 707/203 |
| 5,119,476 | A | * | 6/1992 | Texier .......................... | 395/157 |
| 5,737,608 | A | * | 4/1998 | Van De Vanter ............ | 395/701 |
| 5,740,405 | A | * | 4/1998 | DeGraaf ...................... | 707/203 |
| 5,881,292 | A | * | 3/1999 | Sigal et al. .................. | 395/712 |
| 5,956,732 | A | * | 9/1999 | Tsuchida ..................... | 707/203 |
| 5,960,444 | A | * | 9/1999 | Jackson ....................... | 707/203 |
| 5,983,242 | A | * | 11/1999 | Brown et al. ............... | 707/203 |
| 6,026,417 | A | * | 2/2000 | Ross et al. .................. | 707/517 |
| 6,182,286 | B1 | * | 1/2001 | Sigal et al. ................... | 717/11 |
| 6,205,579 | B1 | * | 3/2001 | Southgate .................... | 717/11 |
| 6,216,175 | B1 | * | 4/2001 | Sliger et al. .................. | 710/1 |
| 6,226,658 | B1 | * | 5/2001 | Smith .......................... | 707/517 |
| 6,347,323 | B1 | * | 2/2002 | Garber et al. ............... | 707/203 |

\* cited by examiner

*Primary Examiner*—Frantz Coby
(74) *Attorney, Agent, or Firm*—Ronald M. Anderson

(57) ABSTRACT

Attributes of objects within a file that was created in a different environment from that in which the file is opened are preserved, enabling the attributes to be maintained after the file is saved. For example, an HTML document created with a text editor includes objects such as plain text and HTML tags with which attributes such as whitespace, line breaks, and indent level are associated. When such a document is opened in an HTML editor implementing the present invention, the attributes of these objects are preserved. Even when changes to these objects occur, to the extent possible, attributes of objects that were in the document as originally opened in the HTML editor are determined, so that these attributes can be applied to related objects that are added to the document or in regard to changes that are made by the user. The preservation of persistent object attributes is also applicable to other types of software applications such as language development systems and word processing programs. This invention thus insures, for example, that functions developed in newer versions of a program, although not recognized in an earlier version, persist when a file is opened in the earlier version and then saved.

32 Claims, 10 Drawing Sheets

ROBUST MODIFICATION OF PERSISTENT OBJECTS WHILE PRESERVING FORMATTING AND OTHER ATTRIBUTES

RELATED APPLICATIONS

This application is a continuation-in-part of U.S. patent application Ser. No. 09/282,027 filed Mar. 26, 1999 now U.S. Pat. No. 6,347,323, the benefit of the filing date of which is hereby claimed under 35 U.S.C. §120.

FIELD OF THE INVENTION

The present invention is generally related to the preservation of attributes of persistent objects when modifications are made thereto, and more specifically, to preserving attributes of the objects when a file including the objects is opened within an environment different than that in which the file was originally created.

BACKGROUND OF THE INVENTION

As a general rule, new versions of software add functions and attributes to objects in the software that were not found in previous versions. Because of differences between successive versions of a program related to implementing new functionality, problems can arise when a document or file created under a newer version of a software program is subsequently opened, executed, and/or revised, and then saved by an older version of the software. For example, Microsoft Corporation's WORD™ version 7 word processing program includes a feature in which Internet (or intranet) links are automatically recognized so that the corresponding site/page is readily accessed in a browser program activated when the link is selected (i.e., by double clicking a mouse or other pointing device while the cursor controlled by the device is over the link). To clearly differentiate such links from normal text, they are typically displayed using a blue font. Any document that includes such a link, when opened, in an earlier version of the WORD™ word processing program, will also display the link in the blue font, but the older version of WORD™ will not provide the underlying hypertext link to the site referenced by the link and is unable to automatically cause a browser to open up the page referenced by the link. Moreover, if the document that originally included the link was created in version 7 of the WORD™ word processing program is opened and saved in an earlier version of the program, a hypertext link will no longer be associated with blue font text that references the site if the saved document is subsequently opened in version 7 of the word processing program. In other words, since the older version of the word processing program is not equipped to recognize the hypertext association originally included in the document, the software does not preserve the hypertext association in the document when saving it. The new or added functionality associated with objects in the document is thus lost as a result of the document being opened and saved by the earlier version of the word processing program.

A related problem arises when a hypertext markup language (HTML) document created in a conventional text editor is subsequently imported into, for example, Microsoft Corporation's FRONTPAGE™ software application, which includes an HTML editor. This HTML editor is of the "what you see is what you get" (WYSIWYG) type, which greatly facilitates developing the desired look and feel of a web page compared to simple text editors. (Note—the discussion of HTML documents that follows herein and in the claims is intended to encompass extended markup language (XML) documents as well.) Earlier versions of FRONTPAGE™ have not made any attempt to preserve the stylistic formatting of an HTML document applied by the user in a text editor, when the document was opened within the HTML editor and then saved, but have simply applied a generally predefined style that is hard coded into the HTML editor, when saving any HTML document. Thus, the original formatting layout, indent levels, whitespace, and other stylistic attributes of objects established by a user in a document when it was originally created and saved with a text editor, were lost by opening the document to make any change within the FRONTPAGE™ HTML editor environment. Simply saving the document after it was opened in the FRONTPAGE™ editor caused these stylistic and layout attributes to be lost.

One of the reasons that the formatting style of an HTML document has not previously been preserved under these circumstances is that an HTML editor usually transforms such a document into a substantially different representation internally, because the internal representation more effectively models how a web browser will display a web page defined by an HTML document. Particularly after changes to an imported HTML document have been made in an HTML editor, it becomes substantially more difficult to regenerate format and style (whitespace) of the original HTML document. However, people who create HTML documents often have strong opinions about retaining the style that they have applied to these documents. Users often believe that their style lends an HTML document readability; further, they may desire to retain a consistent look to all of the HTML documents that they create, based on their preferences. It is not surprising that many users of prior art HTML editing programs such as earlier versions of FRONTPAGE™ have been unhappy about the loss of their preferred formatting style and layout in an HTML document when the document was opened in the HTML editor and then saved.

Of even greater concern than possible loss of a preferred formatting is that changes made by previous versions of FRONTPAGE™ to the whitespace and layout of an HTML document imported into the HTML editor can actually break the functionality of scripts and unknown tags on a page. The result is that simply by opening and re-saving the page (or by editing it in the "wysiwyg" view of the program), the page is so changed that scripts may not function and the formatting and layout of page's displayed content may possibly be changed.

Ideally, an HTML document created in one environment that is imported into another environment, such as an HTML editor, should preserve the document's original formatting, including both the text and layout style (whitespace) around objects, as much as possible. Importing an HTML document into an editor should not cause any loss of functionality or loss of formatting in tables. Furthermore, the HTML editor should determine the formatting style employed in an imported HTML document created in a different environment so that the style may be applied to changes made to the document within the HTML editor and to newly added objects. Clearly, if a user has simply opened an HTML document within the HTML editor and saved it without making any changes, additions, or deletions, the exact formatting style and text of the original document should be retained. It would also be desirable to enable the user to compare the original version of the HTML document with the version that is saved, after changes, deletions, or additions have been made by the HTML editor. This comparison might be made using any of various types of document comparison tools available from other sources, so that the user can see the changes made as a result of editing the HTML document.

The prior art does not provide a fully satisfactory solution to these problems. Macromedia's DREAMWEAVER™ software includes an HTML editor that preserves much of the whitespace in an imported HTML document that has been opened and then saved. However, once a structure or region in an imported HTML document is edited in the DREAMWEAVER HTML editor, the whitespace is reformatted to conform to an internally predetermined style that is part of the software program. Furthermore, if text is added to an imported HTML document open in the DREAM-WEAVER™ HTML editor, the indent level of the existing surrounding text is not applied to the newly added text. When a copy/paste editing function is implemented in an open document, i.e., when formatted text is copied and then pasted into a different part of an HTML document, all surrounding whitespace related to the copied text is lost in the region in which the text is pasted.

Another prior art editor, which is used for more general program development applicable to a multi-tier architecture, appears in Microsoft Corporation's VISUAL INTERDEV™, version 6.0 software. This editor attempts to preserve certain attributes of specific objects in an imported text file. Whitespace in a text file that is opened in the editor and saved without changes is preserved; but, if changes are made in the file, tags may be modified, attribute value case is not preserved, attribute ordering is not preserved, and whitespace is not preserved. In addition, whitespace surrounding plain text is not preserved. Entities that may appear in the text, e.g., representation of printable characters in a form such as "a" are generated when needed, but only in one preferred form, not necessarily in the form employed by the user in an imported file created in a different environment. It would be preferable to preserve the form used in an imported text file and to employ the same type or form for representing any new entities added to a document or file.

As will be apparent from the initial discussion relating to the problems that arise due to differences in attributes employed in different versions of a word processing program, these problems are not limited to imported HTML documents opened in an HTML editor. More generally, these problems can arise when files that include objects having associated attributes, in one system are opened in another system or software environment. For example, in a programming environment, the class of an object should persist, even though class descriptions change in a different environment/version of the programming language. This point is illustrated by the following. Assume that a software system includes an object named "CEmployee." This object has the following class definition:

```
class CEmployee
{
    CString FirstName;
    Cstring LastName;
    CString SocialSecurityNumber;
    CString Department;
}
```

After the software system enables input data on employees to be printed, it is usually desirable to enable the data to be saved for future use. When making the CEmployee object persistent, most software systems use an algorithm like:

```
CEmployee::Store
{
    Output.write(FirstName);
    Output.write(LastName);
    Output.write(SocialSecurityNumber);
    Output.write(Department);
}
CEmployee::Store
{
    Output.write("FirstName");
    Output.write(FirstName);
    Output.write("LastName");
    Output.write(LastName);
    Output.write("SSN");
    Output.write(SocialSecurityNumber);
    Output.write("Department");
    Output.write(Department);
}
```

The software will invoke these output routines repeatedly, once for each employee object to be stored, resulting in an output stream that looks like:
   John*Doe*123456789*FRONTPAGE+
     Jane*Smith*234567890*FRONTPAGE
or:
   FirstName*John*LastName*Doe*SSN*123456789
     *Department*
   FRONTPAGE+
     FirstName*Jane*LastName*Smith*SSN*234567890*
   Department*FRONTPAGE
where * represents a marker the software recognizes as separating the data values and + represents a marker the software recognizes as separating each object.

The software reads the code with an algorithm such as:

```
        CEmployee::Read
        {
            Input.read(FirstName);
            Input.read(LastName);
            Input.read(SocialSecurityNumber);
            Input.read(Department);
        }
or
        CEmployee::Read
        {
            CString attributeName;
     while (Input.read(attributeName))
            {
                if (attributeName == "FirstName")
                    Input.read(FirstName);
          else if (attributeName == "LastName")
                    Input.read(LastName);
          else if (attributeName == "SSN")
    Input.read(SocialSecurityNumber);
          else if (attributeName == "Department")
                    Input.read(Department);
            }
        }
```

However, a later version of the software may extend the CEmployee class by adding the attribute "Manager":

```
class CEmployee
{
    CString FirstName;
    CStrihg LastName;
    CString SocialSecurityNumber;
    Cstring Department;
```

```
        CString Manager;
}
```

The above definitions of Store and Read will also be extended in the new version of the software in a way that will be apparent to those of ordinary skill in the art. After use with the new version of the software system, the persistent data will appear as:

John*Doe*123456789*FRONTPAGE*JackSprat+
    Jane*Smith*234567890*FRONTPAGE+
    CharlesNoman or FirstName*John*LastName*Doe*SSN*123456789*
    Department*
FRONTPAGE*Manager*JackSprat+
    FirstName*Jane*LastName*Smith*
    SSN*234567890*Department*FRONTPAGE*Manager
    *CharlesNoman But, when these data are presented to the old software system, which is not programmed to deal with the new Manager data attribute, the old software system will either fail, because it expects the + object separator, or it will skip over the unexpected data attributes to the + separator. In any case, the Manager data attribute will be discarded and thus will not be available when the data are again loaded into the new version of the software in which Manager and the * separator are understood.

From the preceding discussion, it will be apparent that the prior art does not provide a complete solution to preserving formatting, layout, and attributes in a document within different environments or systems. Accordingly, there is a need for a method that addresses this problem, by preserving formatting and other attributes of objects in a document or other file that is created in one environment, but opened and saved in a different environment. Also, when changes are made to such a document in the different environment, it is preferable that these changes substantially conform to a style that is derived from that of the original document or file.

SUMMARY OF THE INVENTION

In accord with the present invention, a method is defined for preserving attributes of original objects in a file when the file is opened and saved in a different environment than that in which the file was originally created. The method includes the step of defining a set of preservation rules corresponding to how various objects and attributes associated with those objects are to be preserved in the different environment. Upon opening the file in the different environment, the file is parsed to identify any original objects in the document, and data corresponding to the original objects and any attributes corresponding to those original elements are temporarily stored in the different environment. A user is then enabled to edit the file, as desired. During the editing process, new objects and associated attributes may be added to the file, and original objects and attributes may be changed or removed. The object and attribute content of the edited file is then written to a revised file that includes all of the remaining original objects and their associated attributes, as well as any new objects and attributes that have been added, and the attributes of the original objects are preserved based on preservation rules corresponding to those original objects and their attributes.

Objects in the file may include text entries having whitespace attributes. A whitespace attribute that is associated with a text entry is preserved in the revised file unless changed while the file is open in the different environment. Also, objects in the file may include tag entries having whitespace attributes, and a whitespace attribute associated with a tag entry is preserved in the copy unless changed while the file is open in the different environment. Objects in any class that is unknown in the different environment are preserved in the copy and are ignored in the different environment, but are merged with known objects when the file is written.

A different internal representation of the attributes associated with objects in the file is employed in the revised file as compared with the internal representation of the file in the environment in which it was originally created. Attributes corresponding to original objects in the file are determined when the file is opened. These attributes are then associated with any related new objects that are added to the file while the file is open, so that attributes of the related new objects are consistent with attributes of the original objects.

The method is especially well-suited for use in programming environments in general, and for use in Web design environments in particular. For example, the present invention enables a user to open and display an HTML or other markup-language document created in an original environment that differs from the environment provided by the present invention using stylistic formatting preferences of the user, such that the stylistic format of the document is preserved when thus opened and displayed. The user can then edit and save the document. Upon saving the document, the stylistic format of the original portions of the document are preserved to the extent possible (i.e., to the extent not changed by the editing). In addition, the user may choose to have the stylistic format of the original portions of the document applied to any new objects that are added to the document that have attributes related to the original portions. For instance, the new objects may be automatically indented and new lines may be added when the document is saved, based on an indentation level of related HTML tags that were in original portions of the document.

In addition, the method is able to preserve omitted tags in the HTML document when omission of such tags will not effect rendering of the document. In general, tags that are omitted in an original document will still be omitted in a revised document, unless the document has been edited in a manner that makes the omitted tag significant. In these instances, the omitted tag is explicitly added to the revised document when it is saved, to ensure that the document is properly rendered.

Another aspect of the present invention is directed to a system that includes a memory in which data and machine instructions are stored, a display on which graphics and text are presented to a user, a processor that is coupled to the memory and executes the machine instructions, and a user input device adapted to enable the user to input data and to control the processor. When executed by the processor, the machine instructions cause the processor to implement functions that are generally consistent with the steps of the method set forth above.

A computer-readable medium having computer-executable instructions for performing the steps of the method is yet another aspect of the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 4A:
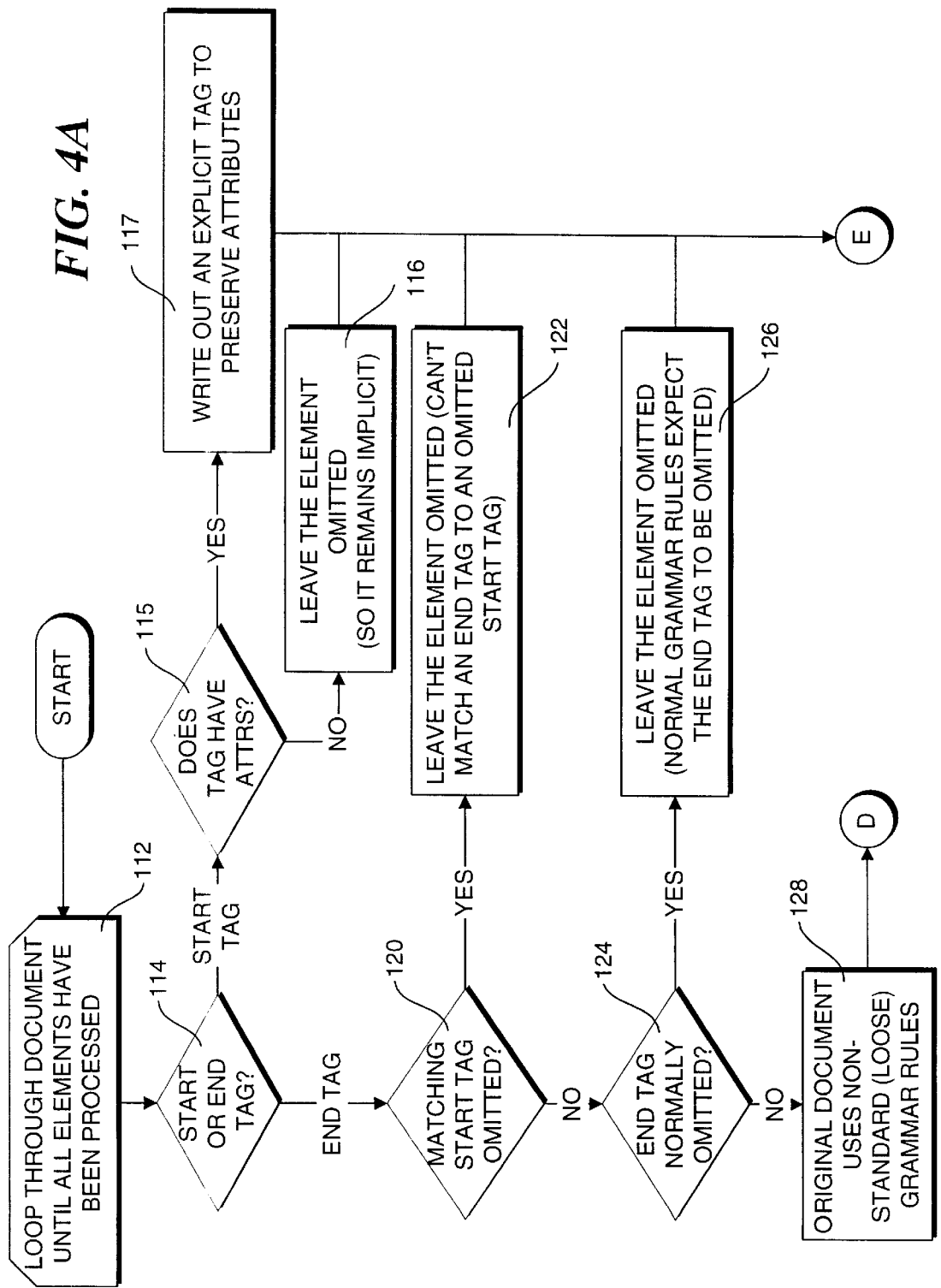
Figure 4B:
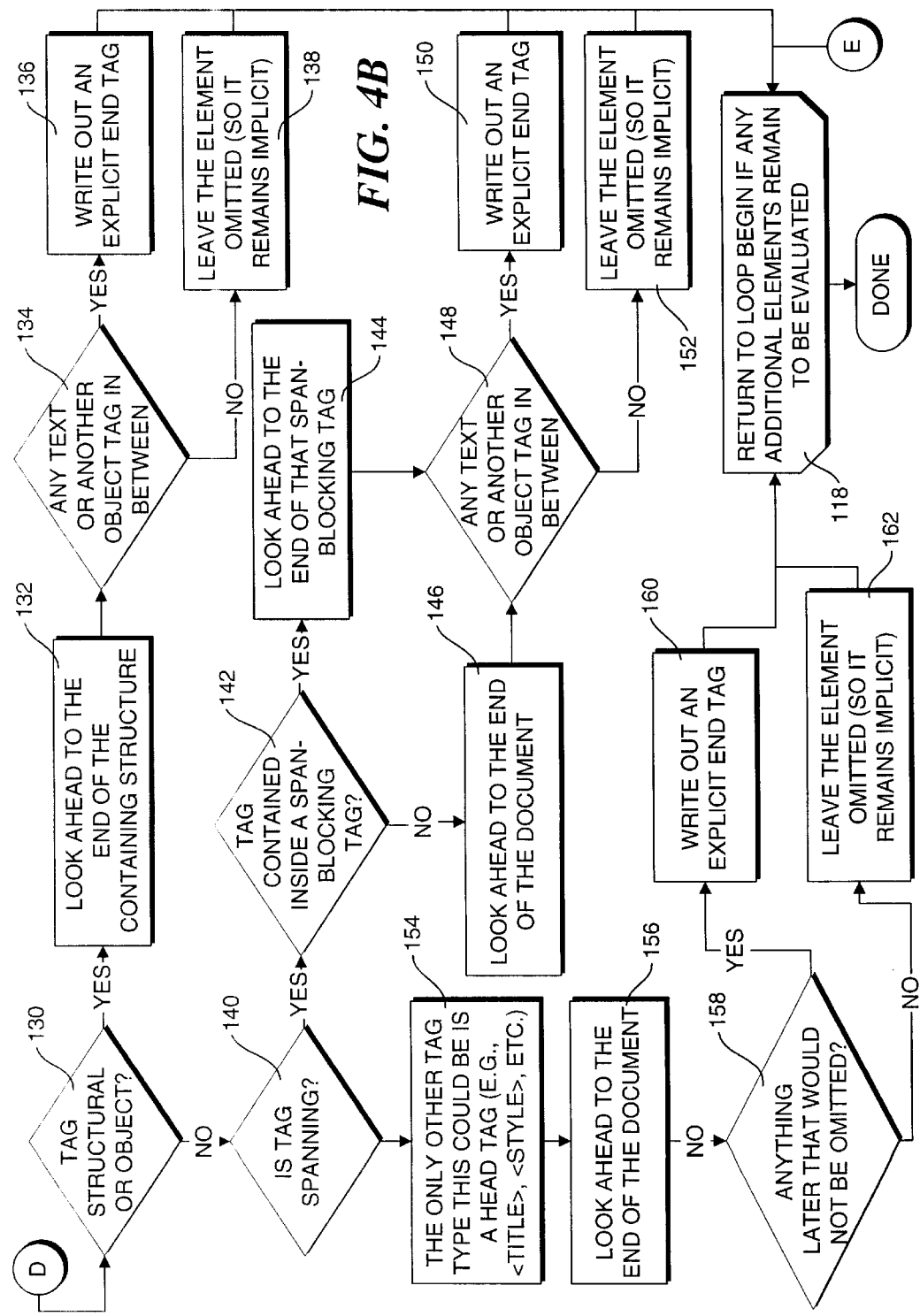
Figure 5:
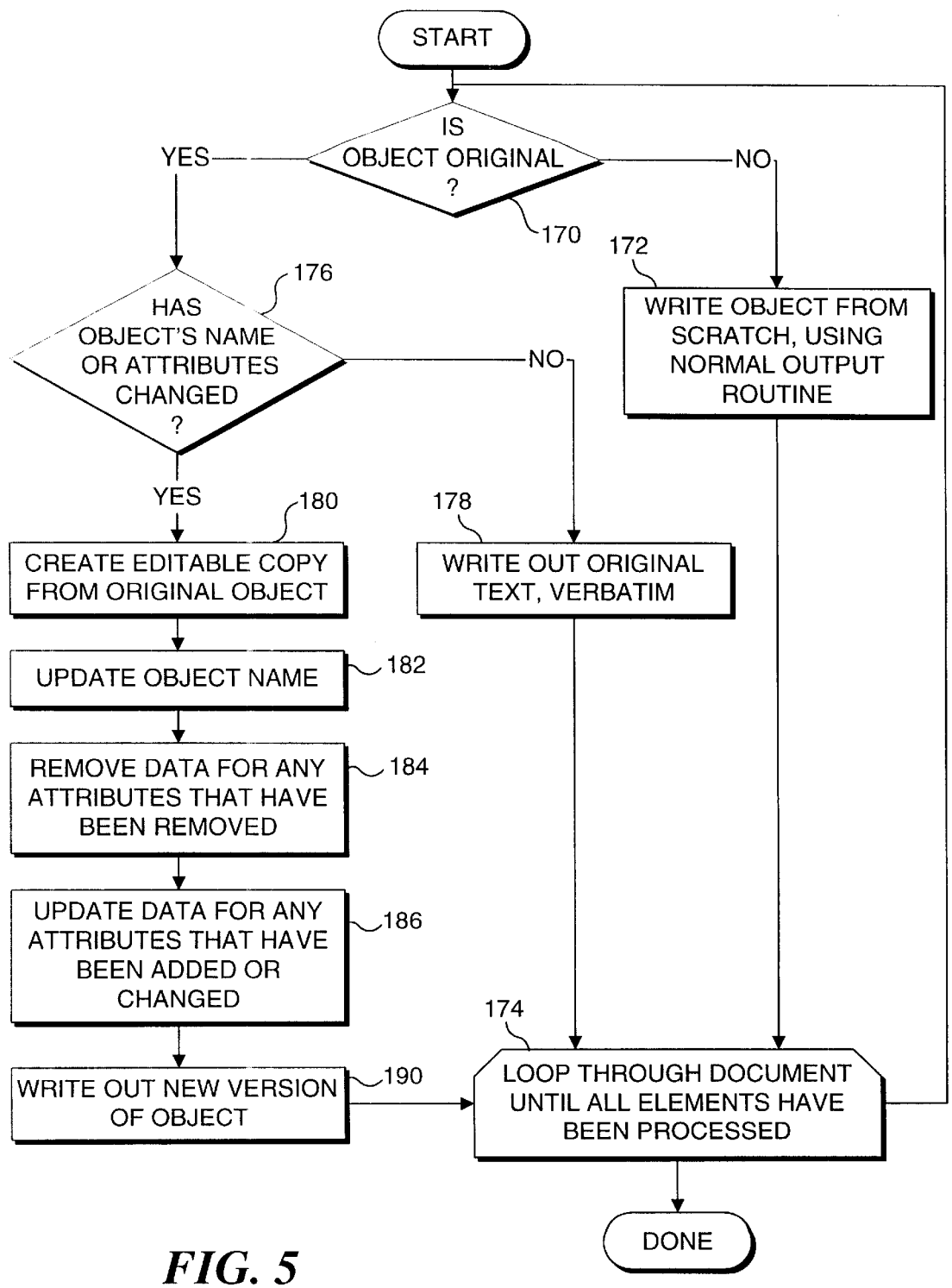
Figure 6:
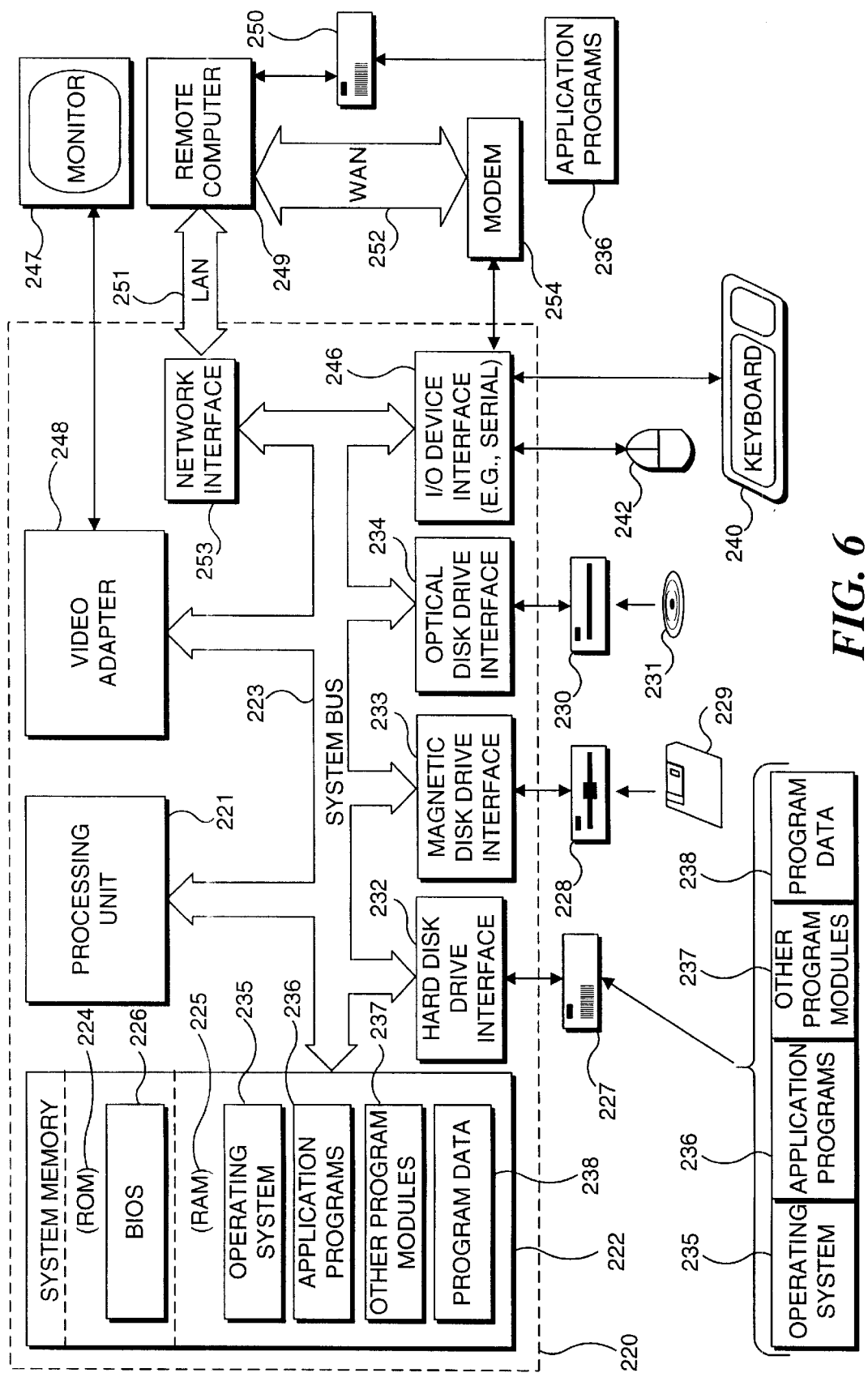

FIGS. 3A–3D collectively comprise a flow chart illustrating how attributes of objects in the document opened in the editor are preserved when the document is saved;

FIGS. 4A and 4B collectively comprise a flow chart illustrating the logic the invention uses for preserving omitted markup language tags in a revised document, and explicitly adding omitted tags to the revised document when necessary to ensure that the revised document is rendered properly;

FIG. 5 is a flow chart illustrating the steps implemented to preserve attributes of objects when a file is saved, and more specifically, to determine whether original text in a file is preserved when the document is saved; and FIG. 6 is a schematic block diagram showing functional components of a personal computer that is suitable for implementing the present invention.

DESCRIPTION OF THE PREFERRED EMBODIMENTS

As noted in the Background of the Invention, the present invention has broad application to preserving attributes of objects in a file (i.e., a software file, a document file, or a data file) created within one environment, when opened within a different environment and then saved. A specific application of the present invention is discussed below to clarify how the invention operates to preserve attributes of objects in an HTML document that has been created with a text editor in which the user has almost complete control of the layout and format of the HTML document. When creating an HTML document with a text editor, a user can readily apply preferences in setting indentation level, tab spacing, line breaks, and other aspects of formatting and layout. These preferences comprise attributes of the text and other objects within the HTML document. The present invention facilitates retention of these attributes when the document is opened, possibly modified, and then saved, using an HTML editor that implements the present invention.

In an HTML document, a number of different objects or elements are typically employed, including scripts, comments, style sheets, and non-HTML tags; however, the two most common types of objects are plain text and HTML tags. Plain text usually comprises one or more words surrounded by and/or separated by whitespace. HTML tags are used for layout and specifying how the text and other object in an HTML document will appear (i.e., their format) in a web page that is based on the HTML document when the page is viewed in a browser. The other types of objects in an HTML document that were first mentioned are less common, and not so relevant to the present invention, since preservation of the attributes associated with them when an HTML document is opened in an HTML editor is less likely to be a problem. In any case, other types of objects can be handled in the same manner as text objects and HTML tags, if it is necessary to preserve their attributes.

A simple example of an HTML document is as follows:

```
<body>
    <p align = 'center'>
        Hello World!
    </p>
</body>
```

In the preceding example, the words "Hello" and "World!" are plain text elements, while "<body>," "<p>," and "</p>," and "</body>" are HTML tags. Clearly, this example is very simple; most HTML documents include many more lines of text and more HTML tags, along with many other types of objects.

The present invention uses a two-pass process respectively performed by an Element Lexer (Lexer) and an Element Parser (Parser), which are used in combination with an Element Writer (Writer) to preserve stylistic attributes of original objects in a document, and to preserve omitted objects in the document. The Lexer reads text from an HTML file and builds tokens that can be used by a browser to render the document. These tokens include HTML tags, words, whitespace elements, entities, and other HTML constructs, such as comments, SGML, scripts, cascading style sheet styles, etc. The Parser acts on the collection of tokens recognized by the Lexer and interprets them by applying pre-defined HTML grammar rules defined in a lookup table.

Under HTML, the same render result can often be achieved using different coding techniques. For example, whitespace elements such as tabs, carriage returns, linefeeds, and spaces may be used for stylistic purposes in the source HTML, yet be insignificant to the appearance of a rendered page. In addition, tags can sometimes be omitted in the HTML document and implicitly added by the browser during a pre-rendering operation. Based on the predefined grammar rules, the Parser is able to determine the whitespace elements that are significant (i.e., that appear as a space when rendered) and is able to identify omitted tags in the HTML.

The Lexer, Parser, and Writer each operate on an Element Substring construct that contains all of the information necessary to reconstruct the original text, including the surrounding whitespace. These substrings also contain flags set by the Parser. Upon opening a document, the Parser assembles an array of element substrings for the HTML editor. The editor builds a tree of tags and text, and associates the substrings accordingly. At save time, e.g., when the user desires to save the document or when the user chooses to view a rendered page corresponding to the document, the editor calls the Writer to write out each tag and word of text in the document. If an element substring remains from the original text, the original text is preserved by examining whether the surrounding whitespace information for each element substring is significant, and taking corresponding action. If no element substring is attached to a given text or tag portion of the document, the portion must be new, and it is added to the file by the Writer. Because the Writer is aware of the HTML grammar, it can examine the information the editor would like to write out, and combine that information with the preserved original text data stored in the element substrings, generating a new document that preserves as much as possible of the original content and modifying elements as necessary in instances where preservation of those elements would alter the rendered appearance of the document.

Figure 1:
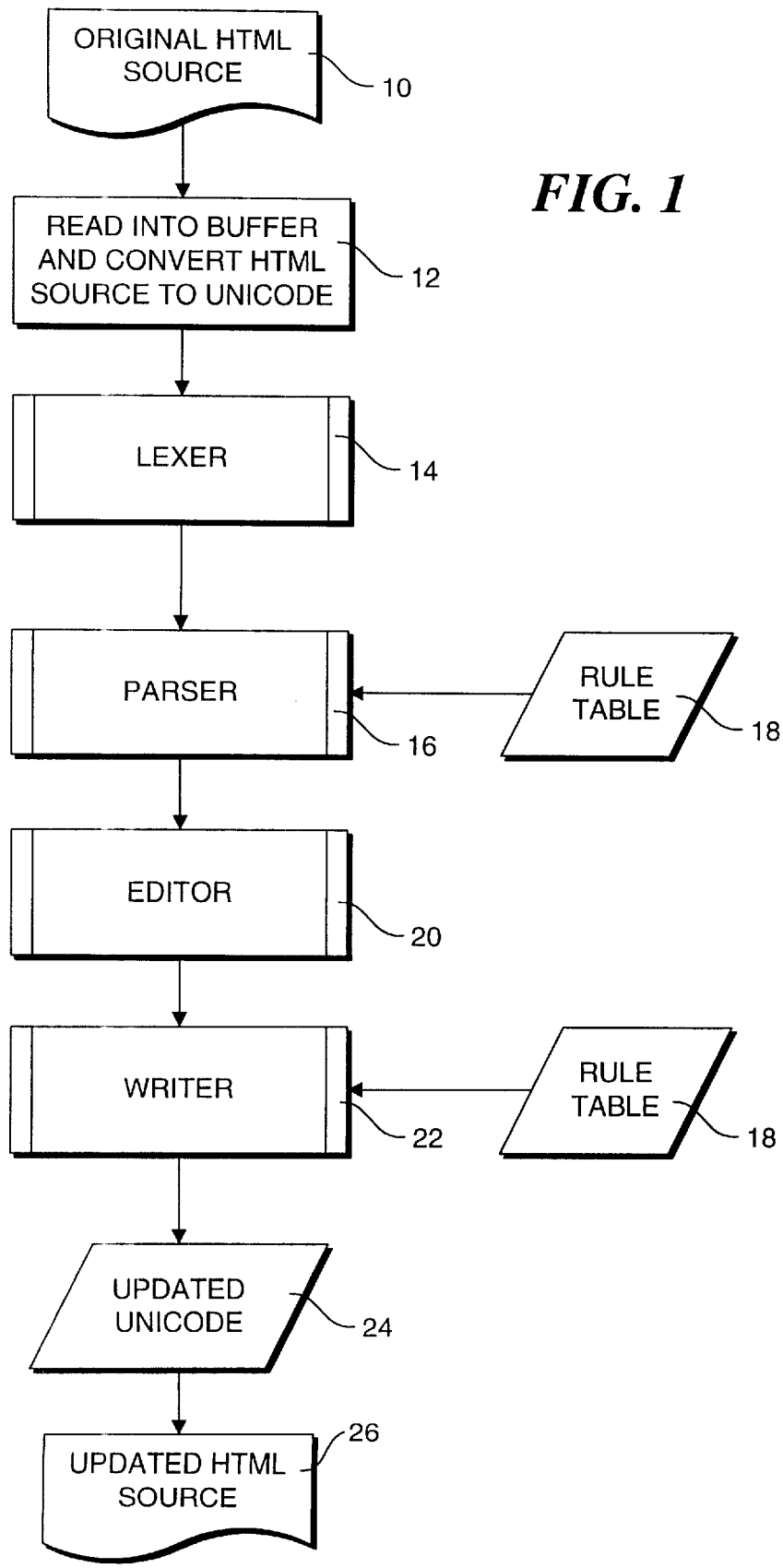
FIG. 1 is a flow chart illustrating an overview of the method used by the present invention to preserve original, objects and their associated attributes.

FIG. 1 illustrates an overview of the process. The process begins by launching an HTML editor that includes the present invention and opening an original HTML source document 10 that has been created using a different editing environment, such as a simple text editor. In a block 12, the HTML code of HTML source document 10 is read into a buffer and converted into unicode. Following this, a first parsing pass of the unicode in the buffer is performed using a Lexer 14, which identifies individual elements, including HTML tags, plain text, whitespace characters, and other objects. During this first pass, a substring is created for each object and contains information that is used later to preserve the stylistic attributes of the original document. A second pass is then performed by a Parser 16, which applies a set of predefined grammar rules contained in a lookup rule table 18 to each of the elements. The internal representation of source document 10 is thus modified to facilitate future editing and saving of the document.

At this point, the document is ready for editing by an editor 20. During editing, the user may enter new plain text and HTML tags, or modify or delete existing plain text and HTML tags. Upon completion of the editing (or during the editing process), the user will typically initiate a save process to save the changes to HTML source document 10, invoking a Writer 22 that preserves the stylistic attributes of objects in HTML source document 10 by implementing the grammar rules defined in rule table 18. The writer produces updated unicode 24, which is then saved as an updated HTML document 26.

Figure 2:
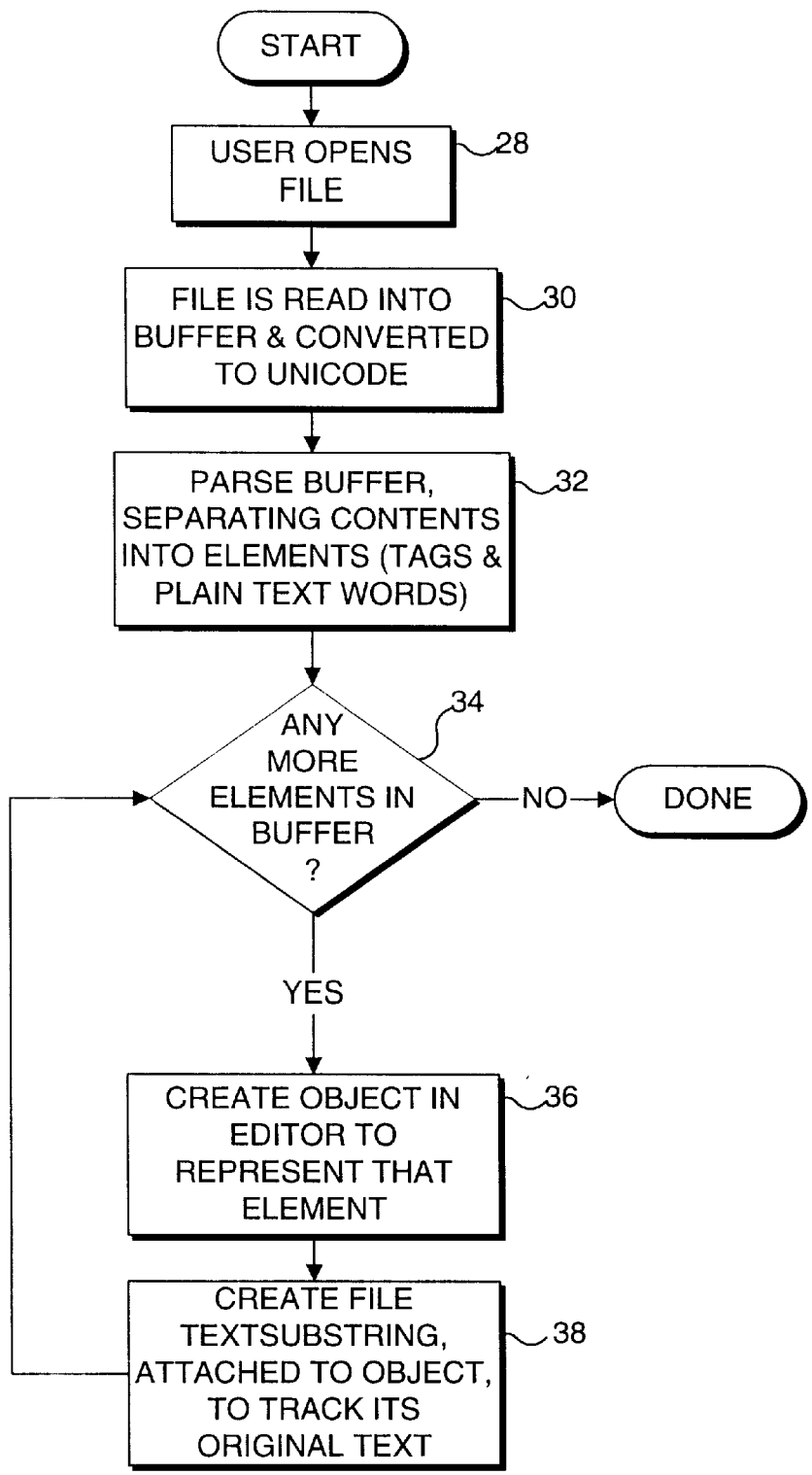
FIG. 2 is a flow chart illustrating the steps implemented when a document is loaded into an editor that implements the present invention.

FIG. 2 illustrates further details of the steps that are implemented upon opening a document, starting with a block 28. As discussed above, the entire HTML document is read in from disk or other non-volatile storage, converted into unicode, and stored in a special buffer referred to as a FileTextBuffer, as indicated in a block 30. In a block 32, the special buffer is parsed from its beginning by Lexer 14, separating its contents into the various elements or objects, including HTML tags and plain text words. The Lexer keeps track of the starting and end point for each object referenced within the special buffer, since these two numbers can subsequently be used to access a FileTextSubstring (i.e., a substring) from the buffer. These numbers comprise a start point and end point for each such substring.

A decision block 34 determines if there are any more elements or objects in the buffer being parsed, and if not, the parsing of the buffer by the Lexer is complete. However, if additional elements exist, a block 36 provides for creating an object representing the current element in the HTML editor. Further, a block 38 provides for creating a FileTextSubstring, which is attached to the object, to track the original text for that object. The logic then loops back to decision block 34 to determine if there are any more elements to be processed in accord with blocks 36 and 38.

A substring is the primary mechanism by which the HTML editor represents original text of an HTML document, without actually needing to copy the text. Thus, a substring, which is contained within the special buffer, is a reference back to the original text. Preferably, the substrings are stored in the form of an array of data structures comprising the following elements:

Struct substring
  buffer*; pointer to the buffer in which the substring is stored
  pos; starting position of string within buffer
  length; length of substring in unicode characters
  element type; type of element
  tag; HTML tag value in list of HTML tags (for lookup purposes)
  leading whitespace; number of preceding whitespace characters
  trailing whitespace; number of following whitespace characters The data in a substring includes a pointer to its position in the buffer and the length of the substring (in unicode characters). Also included in the substring are the number of characters on either side of the substring (i.e., of the text element) comprising its surrounding whitespace, an element type, and a numerical value for referencing the element in a lookup list of HTML tags. The various element types are enumerated as follow.

```
enum EElementType
{
        elmtUnknown = 0,
        elmtWhitespace,       // text elements
        elmtWord,
        elmtEntity,
        elmtStartTag,         // tag elements
        elmtEndTag,
        elmtEmptyTag,
        elmtProcessingInstruction,
        elmtSgml,
        elmtSgmlIf,
        elmtSgmlEndIf,
        elmtComment,          // comment elements
        elmtCommentIf,
        elmtCommentEndIf,
        elmtPreComment,
        elmtVermeerStartSpan,
        elmtVermeerEndSpan,
        elmtVermeerNoSpan,
        elmtMetadataStartSpan,
        elmtMetadataStartStartSpan,
        elmtMetadataEndStartSpan,
        elmtMetadataEndSpan,
        elmtBotHtml,
        elmtStyle,            // style elements
        elmtScript,                // script elements
        elmtDenali,
        elmtEndOfDoc          // this must always be the last
};
```

The following describes some of the element types in detail.

elmtSgml: HTML can contain SGML, which is the parent language of HTML. SGML tags look very much like HTML, except the tags contain an exclamation point. For example: <!doctype html>.

elmtComment: HTML comments start with "<!--" and end with "-->". For example: <!-- this is a comment --> elmtProcessingInstruction: This element is a variant of SGML that is commonly used in XML files. It's tags are indicated using question marks. For example: <?xml-:namespace?> elmtEmptyTag: XML introduced a new kind of tag. Basically, it's like a start tag and an end tag combined, so there won't be a separate end tag. This type of tag has a slash at its end, e.g., <img/>.

elmtSgmlIf and elmtSgmlEndIf: Microsoft Corporation's INTERNET EXPLORER™ introduced the ability to have part of a web page display optionally based on whether it could be displayed by the browser in use. An exemplary set of such tags is as follows: <![if vml gte 1]> . . . <![endif]>.

elmtCommentIf and elmtCommentEndIf: These are the same as the SGML if/endif, but use comment syntax, e.g., <?[if vml gte 1]> . . . <![endif]-->.

elmtPreComment: A comment that FRONTPAGE interprets as a flag for the next element.

elmtVermeerStart/End/NoSpan: These, element are the 'bots' that FRONTPAGE pioneered during its earlier versions and are similar to tags, but are written in comment syntax form, e.g., <!--webbot bot=hitcounter-->.

elmtMetadataStart/StartStart/EndStart/EndSpan: These elements are similar to webbot tags above, but are even mere complicated, because they contain an <object > tag.

elmtDenali: Any block of server script that is not part of another element (e.g. script used to set attributes of a tag is different). Example: <%print "hello"%>.

The following elements concern ranges of the file which aren't valid HTML at all. These elements are essentially set aside from the main HTML document and ignored. If an element isn't an HTML element or isn't well-formed, the element is ignored.

elmtBotHtml: The text inside of a bot's startspan and endspan.

elmtStyle: All of the text between <style> and </style> is read as one element called an elmtStyle.

elmtScript: Like elmtStyle, it is all the text between <script>, and </script>. Other element types not specifically noted above are generally well known to those of ordinary skill in the HTML and SGML programming art.

A reference count is maintained for the special buffer so that the act of creating, copying, or deleting a substring referencing the special buffer adjusts the reference count. Even if the document or file for which the special buffer was created is closed, the special buffer is maintained in memory so long as an object using the special buffer remains open on the system.

An example of the components of a substring for the HTML paragraph tag element "<p>" in the simple example of an HTML document set forth above follows. In this substring, it is assumed that each line break is a carriage return, linefeed pair, and that indenting of the text is done using tabs.

| Buffer location: | [memory address of buffer] |
| --- | --- |
| Starting position: | 9 |
| Length: | 20 |
| Leading whitespace: | 3 (CR, LF, Tab) |
| Trailing whitespace: | 4 (CR, LF, Tab, Tab) |

During modification by a user of an HTML document that is open in the HTML editor, elements of the document are typically moved around and copied from one place to another. Since each element tracks its original text via its associated substring variables (like those noted in the preceding example), such modifications do not prevent the original text referenced by the substring variables from being regenerated. Each time that an element is copied inside the HTML editor in accord with the present invention, the substring for the element is also copied, thereby insuring that not only the original text is preserved, but also the whitespace and other attributes of each of the elements comprising the HTML document are preserved.

One type of modification that is difficult to apply without adversely impacting the original look and style of the HTML document as created occurs when the whitespace between previously created elements is modified without altering the text of those elements. It is for this reason that substrings store both leading and trailing whitespace attributes, i.e., to insure that every change in the HTML document causes an examination of the effect it has on the local whitespace around the elements where the change occurred. In some cases, it may be necessary to suppress the whitespace of a substring while preserving the internal original text referenced by the substring. The decision to suppress whitespace is made only at save time.

When HTML tags are modified, no matter how much the user has edited them, the original text included within the tag is a useful guide for formatting the final output and is therefore not discarded. In contrast, when plain text is edited, even if only a portion of the internal text of the plain text element is changed, the substring associated with the plain text element is discarded. The modified text is then included in the HTML document when saved, in the form in which the text was entered. However, any words in a plain text element originally in the document when it was first opened in the HTML editor that remain unchanged are preserved.

The type of HTML tag can also have significant effect on whitespace. Generally, there are three kinds of HTML tags, the simplest being referred to as a "spanning" tag, and including tags such as <a>, <b>, <font>, <strong>, etc. Browsers use spanning tags primarily to modify a font in which the text inside a span is displayed. A "structural" tag determines the layout of a page (e.g., tags such as <body>, <table>, or <p>), while a "no-scope" (or perhaps better referred to as an "object") tag represents a visual object like a picture or an active control (e.g., tags such as <img>, <object>). The distinction between structural and object tags is subtle, but is very important when dealing with whitespace. Because structural tags cause the page to lay out differently, whitespace next to a structural tag in an HTML document has no meaning, and the user can have as much or as little whitespace next to a structural tag as desired, without effect. For example, tabs or spaces between a text element and a structural tag have no meaning with respect to the display of whitespace in the rendered document. Object tags, by contrast, usually represent displayable elements that accompany the text of the document. Therefore, the user needs to pay attention to the whitespace provided around them just as the user would for plain text words.

FIGS. 3A–3D generally summarize the logic employed by the present invention for preserving attributes of the objects of the HTML document when the document is saved. Upon initiating a save action, each element of the document (e.g., HTML tag, plain text, whitespace character, etc.) is examined, in turn, to determine what needs to be done to preserve the attributes corresponding to those elements, as indicated by a block 40 in FIG. 3A. In a decision block 41, the logic determines if the element is a space that is to appear in the rendered page and was entered in the originally document or if the space was entered by the user during the editing session. If the answer (to either case) is yes, the logic proceeds to a decision block 102 in the flowchart portion shown in FIG. 3D, further details of which are described below. If the answer is no, the logic proceeds to a decision block 42 in FIG. 3A, in which the logic determines if the element is the type of element that ends an indented block. Examples of elements of this type include paragraph end tags (</p>) and body end tags </body>. If the answer to decision block 42 is yes, the indent_level stack is popped, as indicated by a block 44.

The indent_level stack comprises a stack of indent levels for the document, wherein the value at the top of the stack corresponds to the current indent level (i.e., the point in the document that is currently being evaluated). During the save and writing process, the writer maintains a state variable list corresponding to the current position in the document, which includes a variable corresponding to the current indent level, along with other state variables, as follows.

State Variable List Definition indent_level: A stack of the indent levels at each scope leading up to the present scope, with the current indent level on top.

blank_lines: Indicates the number of blank lines, if any, that are at the end of what has been written thus far.

white_spaces: Indicates the number of spaces (or the space equivalent for a tab), if any, are at the end of what has been written thus far.

current_line: The current line of the document.

current_column; The current column based on what has been written so far.

spaces_significant: Indicates whether a whitespace character, if written next, would be significant (i.e., would appear in the rendered page as a space).

spaces_significant_stack: A stack of the spaces_significant flag at scopes outside of the current one.

space_pending: Indicates whether the user wants a space to appear in the browser (any combination of whitespace can satisfy this need).

prev_trailing whitespace: The unwritten trailing whitespace from the previous element (unwritten because it is unknown yet if the spaces would be significant). This information is updated after every element is written, and is used during processing of the next element following the current element.

Next, the handling of leading whitespace for the element, corresponding to a first stage of the process, begins. In a decision block 46, the logic determines if a space is pending, which happens when a significant space (one visible to the user) immediately precedes this element, and will be indicated by the space_pending state variable. For example, suppose the original document comprises the following code portion, wherein the "↵" symbol represents a carriage return and linefeed:

```
<p>↵
   Hello↵
</p>
```

If the user then adds a space and the word "World" after the word "Hello" with the editor, and the current element being examined is the word "World," a space pending flag is marked when the space is evaluated, indicating the addition of the space before the word "world." The saved version of the code portion will look like:

```
<p>↵
   Hello↵
   World↵
</p>
```

The space pending flag indicates that a space is pending, causing the logic to proceed to a decision block 48, in which a determination is made as to whether the element has any leading whitespace. On first impression, it would appear that the word "World" has leading whitespace (i.e., the added space). However, under the applicable rules, only an original element can have leading whitespace. Accordingly, the added space is considered to be trailing whitespace for the word "Hello," and the answer to decision block 48 is no, causing the logic to proceed to a decision block 50. Note that if the element was an original element that had leading whitespace, the logic would proceed to a block 52, and the leading whitespace (which may actually comprise multiple whitespace characters) would be written as it exists, thereby preserving the element and any whitespace preceding the element in its original form.

In decision block 50, the logic determines if the preceding element has any trailing whitespace. In this instance, the preceding element, "Hello," has trailing whitespace, i.e., the "↵," and, accordingly, this trailing whitespace is written in a block 54 (i.e., the existing trailing whitespace is preserved).

Suppose that instead of using multiple lines, the original code portion of the document had been written on a single line, i.e., <p>Hello</p>

Further, suppose that the user edits the foregoing by again adding a space and the word "World" after the word "Hello." In this instance, the resulting saved portion of the document would be as follows:

<p>Hello World</p>

As before, when the space before the word "World" is evaluated, the space_pending state variable is marked, and the answer to decision block 46 is yes. Again, since the added word "World" is a new element, it cannot have leading whitespace, and the answer to decision block 48 is no. However, this time, the word "Hello" does not have any trailing whitespace as originally written. As a result, the answer to decision block 50 is no, and a simple space is added between the words "Hello" and "World" in a block 56, thereby replicating the editing action performed by the user. Optionally, if the added word "World" could not fit on the current line (i.e., the editor was at the right margin), a line break would be added to the current line, and the word "World" would be added to a new line at the current level of indentation (i.e., the current value at the top of the indent_level stack.

As a further example, suppose that the original code portion was written,

```
<p>Hello World↵
</p>
``` and the user changes it to:

```
<p>Hello↵
</p>
```

Assume further that the current element is the paragraph end tag </p>. In this instance, no spaces have been added, so the answer to decision block 46 is no, causing the logic to proceed to a decision block 58, in which the logic determines if adding a space would be significant when the document is rendered by a browser, or if the preceding element effects the spacing, as determined by the current value of the spaces_significant state variable. Since adding a space prior to a paragraph end tag </p> would have no effect on the appearance of the rendered page, the answer to decision block 58 is no, and the logic proceeds to a decision block 60 in which a determination is made as to whether the element is an original element. The result is saved for potential use during subsequent processing (see below). Note that if an added space would be significant, further considerations must be evaluated before a determination can be made to write the whitespace, as discussed below.

In the present case, the </p> tag is an original element, so the logic proceeds to a decision block 62, in which the logic determines if the element originally had any leading whitespace. Since the </p> element follows a "↵" (linefeed, carriage return) character, which is a whitespace element, the answer to decision block 62 is yes, and the logic proceeds to a block 64, which provides for writing the leading whitespace element (or elements, if applicable) as it (they) originally appeared.

Now, consider that the case where all of the elements in the preceding example had been written on a single line instead of two lines, as follows:

```
<p>Hello World</p>; original
<p>Hello</p>; edited
```

In this case, all of the answers to decision blocks 46, 58, and 60 remain the same. However, the answer to decision block 62 now becomes no, since there was no whitespace element preceding the end paragraph tag </p> as it was originally written, and the logic proceeds to a decision block 66, in which the logic determines whether any other elements appear on the current line. In the present case, the answer would be no, and the process would proceed to its next stage, further described below with reference to a decision block 70 in FIG. 3B.

Figure 3A:
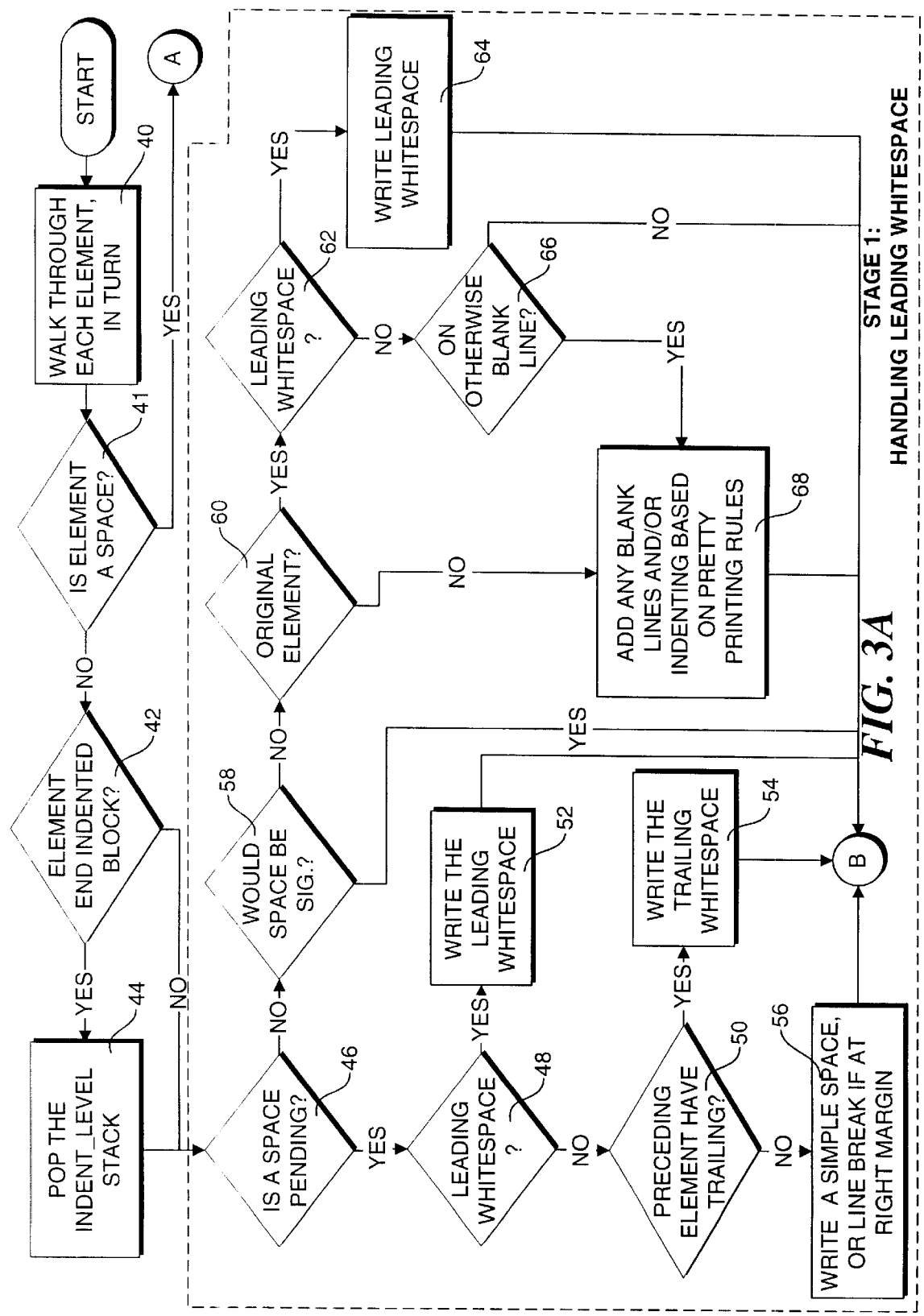

Under the following example, wherein the "→" represents a tab (e.g., four contiguous spaces), the logic would also reach a block 68 in FIG. 3A when evaluating the word "Hello."

```
→ <p>↵
→ → Hello World↵
→ → Goodbye</p>; original
→ <p>↵
→ → Hello World↵
→ → </p>; edited
```

In this case, the tabs prior to the </p> tag have no meaning (with respect to the rendered HTML), and, accordingly, the, only meaningful element on the line is the <p> tag, so the result in decision block 66 is true. As a result, the logic proceeds to block 68, in which a blank line(s) and/or indenting is/are added based on "pretty printing" rules. The "pretty printing rules" are a set of predefined stylistic formatting and layout rules that may be modified to fit a user's preference. These rules enable a user to create a document that has a certain overall appearance, such as having two lines after every indented block, a single line after every paragraph tag, etc. The pretty printing rules also are able to format new elements based on related elements already in the document, e.g., indent newly-added plain text at an indent level corresponding to related HTML tags. In general, most users will tend to stick with the default set of pretty printing rules, although a user interface is providing for changing the default formatting parameters.

In this particular instance, the </p> tag has also triggered block 44 in which the indent stack was popped, leaving the current indent the same as the <p> tag above it. As a result, the writer would align the <p> and </p> tags so that they share the same indent level, e.g.,

```
→ <p>↵
→ → Hello World↵
→ </p>; as written.
```

Note the pretty printing rules of block 62 are also applied if the answer to decision block 60 is no. For example, if the current element was a new word at the start of a paragraph, the pretty printing rules might add a corresponding number of blank lines prior to the start of the new paragraph, and indent the new paragraph to an indent level corresponding to a default (e.g., one four-space tab from the previous <p> tag) or a user-selected value based on related HTML block elements.

Figure 3B:
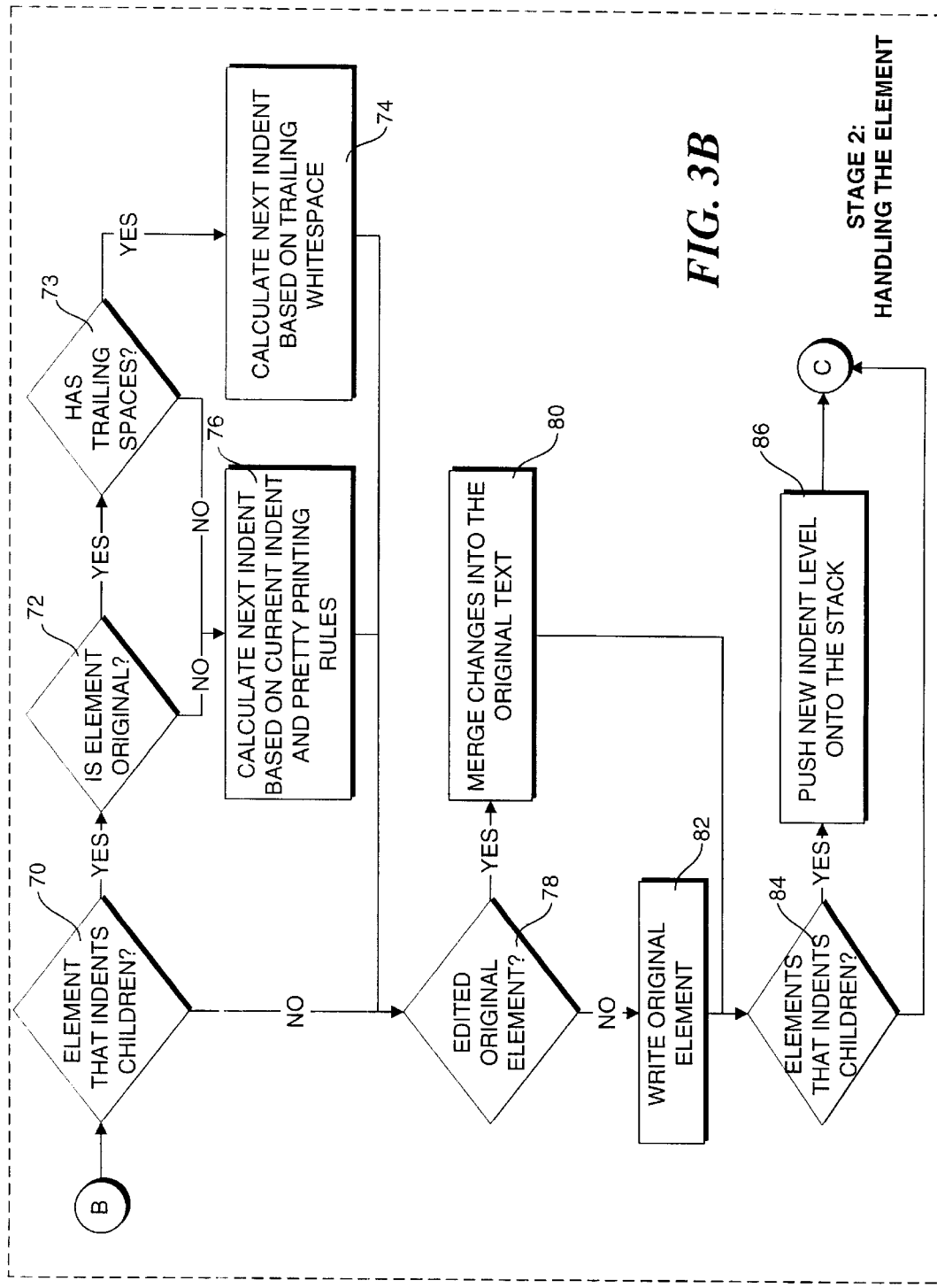

The next section of the flowchart concerns a second stage of the process corresponding to the handling of the element itself. With reference to FIG. 3B, the logic proceeds to decision block 70, in which a determination is made as to whether the element is the kind that indents its children. Examples of such elements include paragraph start tags (<p>), body start tags (<body>); and table start tags (<table>). As with decision block 60 above, the result from decision block 70 is also saved for further processing. If the result in decision block 70 is yes, the logic next determines if the element is an original element in a decision block 72. If the answer to decision block 72 is yes, the logic proceeds to a decision block 73 to determine if the original element has any trailing whitespace. If the element is an original element and has trailing whitespace, the next level of indention is determined based on that trailing whitespace for the element in a block 74. If the element is a new element or was an original element that had no trailing whitespace, the next level of indentation is determined as a function of the current level of indentation (i.e., the current value is of the indent_level stack) and the pretty printing rules in a block 76.

The logic next proceeds to a decision block 78, in which it determines if the element is an original element that has been edited. For example, suppose the original portion is

```
<p align = 'center'>
    Hello World!
</p>
``` and is changed to

```
<p align = 'right'>
    Hello World!
</p>
```

In this case, the paragraph alignment, which is part of an original <p> element, has been changed from 'center' to 'right.' As a result the result in decision block 78 is yes, and the changes are merged into the original text in a block 80. If the result in decision block 78 is no, the original element is written in a block 82.

In a decision block 84, a determination is made as to whether the element is the kind that indents its children. Since this determination is the same that was performed above in decision block 70, the result in decision block 84 can be obtained by simply recalling the previously-stored result for decision block 70. If the answer is yes, the new indent level determined in either block 74 or block 76 is pushed onto the indent_level stack in a block 86.

Figure 3C:
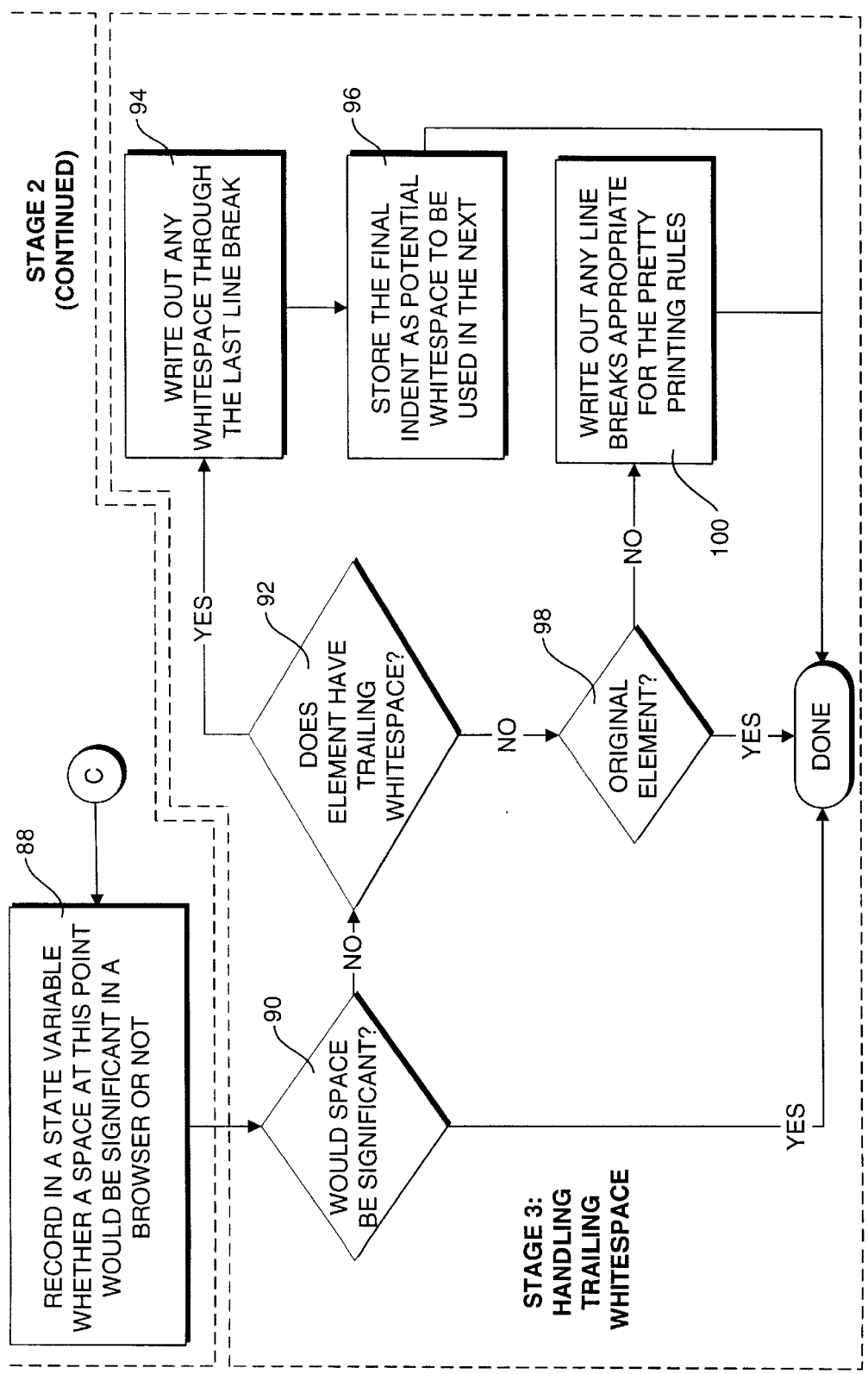
Figure 3D:
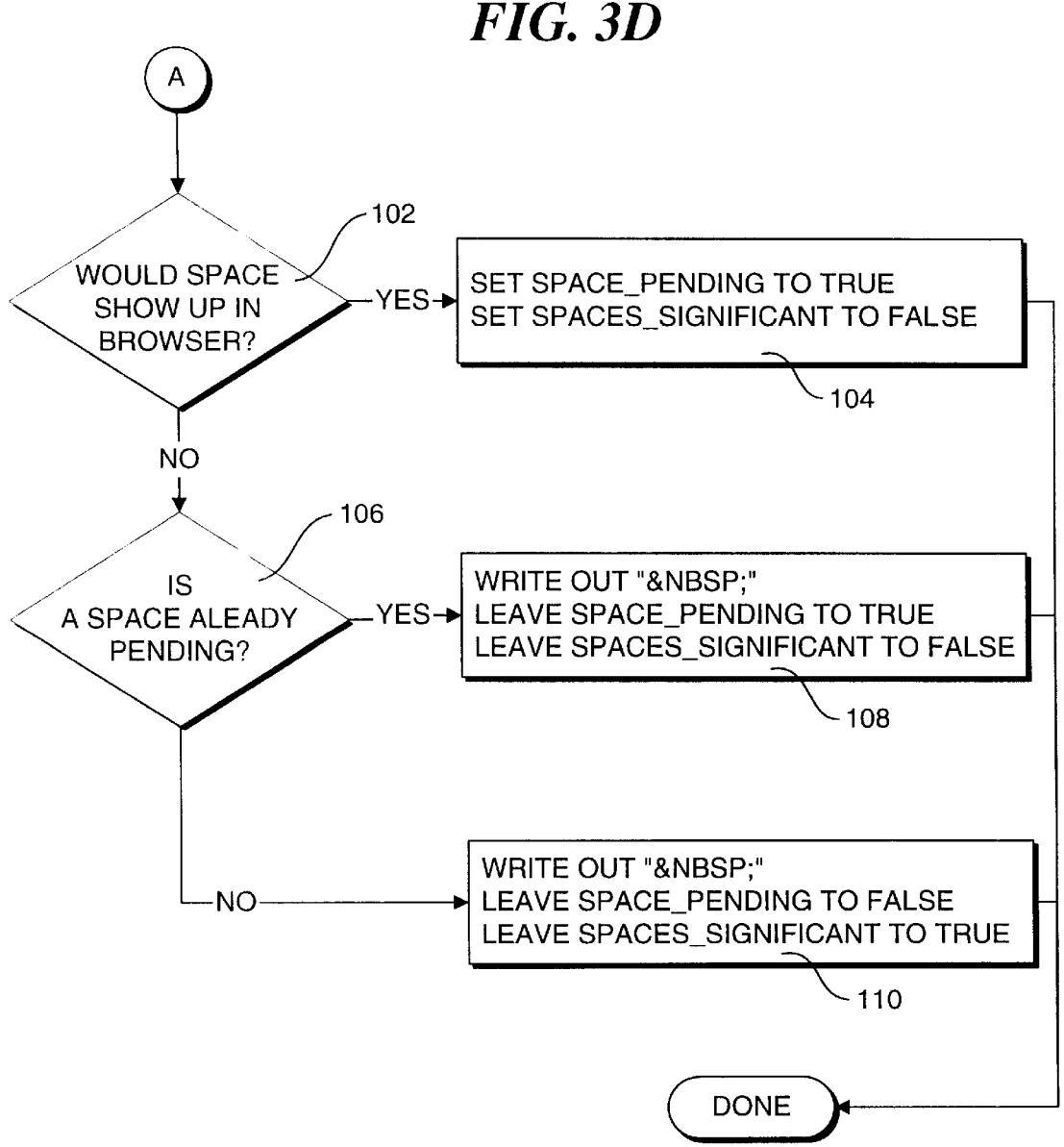

With reference to FIG. 3C, the logic next proceeds to a block 88, wherein the spaces_significant state variable is flagged to indicate whether a space at this point would be significant when the page is rendered in the browser. Depending on the type of element, this variable may be set to TRUE, FALSE, left alone, or may revert to a previously-saved state.

The next section of the flow chart in FIG. 3C concerns a third state of the process corresponding to the handling of trailing whitespace for an element. In a decision block 90, the logic determines if adding a trailing space would effect the rendered document, making a determination based on the spaces_significant state variable that was just set. If the result is yes, no whitespace is added, the processing of the current element is complete, and processing of the next element begins. If adding a trailing space would not alter the appearance of the rendered document, the logic proceeds to a decision block 92, in which the logic determines if the element already has trailing whitespace. If the response is yes, any whitespace is written out through the last line break in a block 94, so as to preserve the original appearance of the element and its trailing whitespace. The final indent position is then stored in a block 96 as potential whitespace to be used in processing the next element.

If the element does not have any trailing whitespace, the answer to decision block 92 is no, and the logic proceeds to a decision block 98, in which the logic determines if the element is an original element. If the element is not an original element, any appropriate line breaks are written out using the pretty printing rules in a block 100, and the processing of the current element is complete.

Recall from above that a determination was made in decision block 41 (FIG. 3A) as to whether the current element was a space. Spaces in HTML documents may or may not be reflected when a displayed page corresponding to the document is rendered in a browser. For example, spaces immediately following <p> tags or preceding </p> tags have no effect on the rendered page. If the space is not significant (i.e. the browser would not render it), the parser discards it, relying on the surrounding whitespace of neighboring elements to reconstitute it. Only significant spaces are passed on to the editor, and so only significant spaces are passed by the editor back to the writer for output. When the editor passes a space to the writer, the response in decision block 41 is yes, and the logic proceeds to decision block 102 in FIG. 3D. In this decision block, the logic determines if white space here would be reflected in the rendered page on the browser. If so, the space_pending state variable is set to true, the spaces_significant state variable is set to false in a block 104, and the processing of the space element is complete. The reason the spaces_significant variable is set to false is so that if another space follows, it will be determine to not be significant, and will be merged with the first space.

If the space would not effect the rendered page, the response in decision block 102 is no, and the logic proceeds to a decision block 106, in which a determination is made as to whether a space is already pending, by reading the space_pending state variable. If the space_pending state variable is set, the response in decision block 106 is yes, and the logic proceeds to a block 108 in which a non-breaking space character ( ) is written for the first space, the space_pending state variable is left set to true and the spaces_significant is left set to false, now reflecting the second space, and the processing of the space element is complete. If the response to decision block 106 is false, the logic proceeds to a block 110 in which a non-breaking space character is written because that is the only way to cause the user's desired space to become visible, the space_pending state variable is left set to false, and the spaces_significant is left set to true, completing the processing of the current space element.

Preferably, the results of many of the foregoing decision, blocks are determined through use of a rules lookup table that includes a set of predefined rules corresponding to HTML elements that might be commonly found in typical HTML documents. The ruleset definition for each element comprises a data structure in accord with the following C++ class definition.

```
class VTagGrammarRule
{
    Vatom       m__nTag;
    int         m__nEatSpaces;
    ETextScope  m__nContainText;
    ETagType    m__nTagType;
    EPairRule   m__nPairRule;
    Vatom       m__aLegalParents[MAX__LEGAL__PARENTS];
    Vatom*      m__aAltCloseTags;
    int         m__nFlags;
};
```

The various components of the data structure are as follows.

Vatom: An integer identifying a known tag.

ETextScope; States whether this element can contain text directly, or can contain only text, or neither.

ETagType: All tags are divided into structural, spanning, object (text-level), or header types.

EPairRule: The rules for each tag that indicate whether the tag must be explicit, or can be inferred from surrounding tags. This variable tracks the rules for both the start and end tags.

The following examples correspond to entries in the table for the <h1>, <meta> and <img> HTML tags.

```
    TGR(H1, esParagraph, tsYes, ttParaStruct,
prRequired), { PARA__PARENTS, 0 }, g__aAltCloseH1,
rfNeedbspIfBlank}
```

The foregoing states that an <h1> tag destroys spaces like all paragraphs (i.e., spaces before the start tag and after the end tag are not significant), it may contain text directly, it is a structural tag (albeit a special kind of structure), and both its start and end tags are required. Furthermore, this tag has several valid parents, can be closed in some unusual cases by other tags, and also provides a flag indicating that if there is a blank <h1></h1> tag, the tag should not be displayed; blank <h1>'s should be written as <h1> </h1>.

In contrast, the following defines the rule for handling a <meta> tag element:

```
    TGR(META, esNoEffect, tsNo, ttHead, prNoEnd),
{ HEAD__OR__BODY, 0 }, 0, 0 }
```

This rule provides that a <meta> tag has no effect on surrounding whitespace, that it cannot contain text, that it is a header tag, and that not only is the </meta> tag optional, it is in fact not used at all. It also indicates that the <meta> tag can occur either in the head or the body, and that there are no other rules applicable to other situations.

Finally, the following defines the rule for handling an <img> tag:

```
TGR(IMG, esNoScope, tsNo, ttObject, prNoEnd),
{ P_TAGS, 0 }, 0, 0 },
```

This rule provides that the <img> tag has the same effect on whitespace as other "no-scope" tags—namely, spaces on both sides are treated as significant. Furthermore, the <img> tag cannot contain text; it is an object kind of tag (meaning it occurs at the same scope as text), and it does not use an end tag. In addition, the <img> tag needs to have a paragraph of some kind for a parent.

In a manner similar to the foregoing rule definitions, rule definitions are provided for various other HTML elements such that when each element is evaluated, the rule for handling the element can be looked up in the rules table. Furthermore, the rules are defined such that each original element and its surrounding whitespace are preserved as much as possible, with exceptions occurring in situations in which the appearance of the rendered page would be altered.

In summarizing the logic implemented in writing out substrings during the saving of an HTML document, the first stage considers the leading whitespace in each substring and determines the number of line breaks and blank columns or spaces that should precede the current element being processed. Whitespace existing at the end of the output buffer is checked to determine that it has at least the required whitespace. However, if less than the required amount is provided in the output buffer, characters from the original text are used to replicate the required nuances of the whitespace. Thus, tabs remain tabs, spaces remain spaces, blank lines that had a specified number of spaces in them retain those spaces, etc.

If the output buffer is receiving input for a new line, an original element will contain information in the leading whitespace of its substring causing it to indent properly. A new element, which has no original substring associated with it, or where the original substring has no leading whitespace, is formatted by indenting it to the current indent level. This procedure produces a document in which the text and other elements are consistently indented, easy to read, and follow the style of the original HTML document opened in the HTML editor.

In the second stage, when writing out a substring, the original text portion is written to memory by simply copying the text from the original FileTextBuffer into the output buffer. If an element has been changed by the user, the procedure attempts to alter the original text as little as possible while still carrying out the change(s) made by the user. Thus, in one of the exemplary HTML code portions above, a change to the text in the HTML tag "<p align='center'>" to add a new attribute "color=red" would be implemented by adding the new attribute to the original text, yielding "<p align='center' color=red>."

In the third stage, trailing whitespace is considered. If no edits are made to the part of the document being saved, the trailing whitespace of one element is equal to the leading whitespace of the next element. Thus, the logic implementing handling of leading whitespace in stage 1 of FIG. 3A recognizes that the whitespace currently at the end of the output buffer is identical to the whitespace it was about to output and therefore does not need to add any additional whitespace. If edits occur around a tag element, output of the trailing whitespace insures that the style of the original text is maintained.

In order to avoid adversely effecting the indent model employed by the user, only the portion of the whitespace that represents line breaks is output at this point. The final spaces and/or tabs employed to indent the next line are not yet output. This technique works properly because if the next element is part of the original document, its leading whitespace will complete the indenting where the previous element's trailing whitespace left off. However, if the next element is not original, or if the element is original but was not originally contiguous with the previous element, the steps implemented in stage 1 of the process will still cause appropriate spacing or indenting to be applied.

As noted above, the indent_level stack is used for maintaining the indent level so that when the end of a structure is reached, its indent level can be popped from the stack, enabling a previous indent level to again take effect. If the tag is a last item on a line, its trailing whitespace can be used to determine what indent level for the next line should be used by the Writer. If the tag is not the last item on its own line, then the contents should not be further indented. But, to the extent that they wrap, the contents of that line should at least wrap to the same level as the current line. It will be noted that this step does not change the indent level at all, but is employed simply to keep the stack in sync with the tag list. For example, when writing out the substring for <p> set forth above, only the carriage return and linefeed would be output during stage 3 of the procedure. However, the general indent level would be changed to two tabs. If the word "Hello" is the next element to be output, its leading whitespace will cause the two tabs to be added automatically during stage 1 of the procedure. Alternatively, if any new text has been inserted at that point, that new text will still be indented by two tabs, making it consistent with a general indent level at that point in the document. Yet if no text follows, and the </p> element ends the empty paragraph, the writer is able to un-indent correctly and without hassle.

In one preferred embodiment of the present invention, special symbols and characters from foreign languages are treated as separate plain text elements, even if there are no spaces between them in the original text. Doing so insures that such symbols and characters are preserved and not modified simply because they are not normally used within the HTML editor. For example, the copyright symbol "©" can be written in the preceding manner, or can be represented in text as "©." Similarly, an em-dash can be directly represented in text, or can be represented by the form "—." Preserving the original representation chosen by the user avoids problems with character set usage in the file or document when it is later opened in a different environment. The present invention uses the substring code to insure that the representation chosen by the user in the original document is never arbitrarily replaced by some substitute.

The present invention is implemented in a software program that is able to write HTML tags, with any list of attributes, both known and unknown, when saving an HTML document that has been opened in the HTML editor. As will be apparent from the preceding description, this invention provides for separating HTML tags with line breaks and indenting lines that include HTML tags, and hiding tags that are optional. Similarly, the present invention preserves plain text, including entities such as foreign language characters and special characters, and wraps lines that are too long to fit in a predefined display width. More importantly, the present invention permits the user to customize the functions by defining preferences for indent level, specifying HTML tags that indent their contents, indicating HTML tags that should add line breaks, specifying the location of the right margin to determine where line wrapping occurs, etc. The user may elect to apply such customization to a document that has been opened in the HTML editor so that Writer 22 consistently writes such a file in a way defined by the user, each time that an HTML document is saved. In this case, preserving attributes of the HTML file has a lower priority, while the customization option selected by the user has a higher priority in determining the overall look and formatting of an HTML document, where the document was created in a different environment, but has been opened and, saved by the HTML editor.

However, the degree to which a user defining such formatting preferences when customizing settings for a HTML editor would need to be rather extensive to cover all possible options. Thus, it is preferable for an HTML editor incorporating the present invention to determine attributes applied in the original HTML document in order to determine user preferences that should be applied to plain text and HTML tags, which are either changed or added during editing of the document. The present invention therefore determines or estimates style guidelines that the user employed when originally creating the document that are optionally applied to changes to the document to maintain a consistency in the document, as originally created.

In addition to preserving attributes of HTML elements, the present invention also preserves omitted tags whenever possible, unless such preservation would alter the appearance of a document when it is rendered. Since HTML is a loosely structured language, omitted tags are a fairly common occurrence, especially when an omitted tag does not have any effect on how a document is rendered. However, while an omitted tag in an original document may be harmless, the omitted tag may have a significant impact after the original document has been edited, and, accordingly, the present invention explicitly adds omitted tags if necessary to ensure that the rendered document is rendered in accord with the edits made to it.

During the parsing pass discussed above, Parser 16 examines and identifies all of the HTML tag elements, but also identifies instances in which a start or end tag is omitted by creating a substring of zero length for that tag. For example, many HTML tags comprise start and end tag pairs, such as <p> . . . </p>, <table> . . . </table>, etc.; omitted tags corresponding to start and end tag pairs are easily identified. Additionally, some tags are commonly omitted in an HTML document, and added during pre-rendering by a browser so that the document is properly rendered. For example, it is very common to omit table body start and end tags, <tbody> and </tbody>. To compensate for this situation, the browser adds <tbody> and </tbody> tags during pre-rendering of the document at appropriate locations so that the document is properly rendered. Tags of this type are termed to be "implicit" tags, i.e., their existence is implied, even though they are not present in the HTML document. In other cases, omitted end tags are implied based on the structure of the document.

With reference to FIGS. 4A and 4B, the following omitted tag preservation process is performed on each omitted tag identified during the parsing pass, as provided by a start loop block 112. The processing loop begins with a decision block 114, in which the logic determines if the omitted element is a start tag or an end tag. In general, there will be instances in which start tag and end tag pairs are omitted, and instances in which end tags are omitted, since the functionality that would be provided by the end tags, if they were not omitted, is implied by subsequent start tag elements or by the end tag of their parent structures. In contrast, occurrences of omitted start tags alone will be rare, since an end tag by itself has no meaning, and is ignored by the browser. The following exemplary HTML code illustrates a typical table structure in which both a table row start tag (<tbody>) and a table row end tag (</tbody>) are omitted—a common occurrence:

```
<table>
    <td> data
    </td>
</table>
```

During the parsing pass, Parser 18 temporarily adds the table row tags (shown in bold font below), as follows.

```
<table>
    <tr>
    <td> data
    </td>
    </tr>
</table>
```

If the omitted tag is a start tag, e.g., the <tr> tag above, the logic proceeds to a decision block 115, which determines if the tag has gained any attributes. An implied tag has no attributes, and if that is still the case, the tag is not added and it remains implicit, as provided by a block 116. However, if attributes have been added by the user, the tag must now be written explicitly, as provided by a block 117. In either case, the logic proceeds to a loop end block 118 (See FIG. 4B), which causes the logic to loop back to start block 112 to begin evaluation of the next omitted tag, unless there are no more omitted tags to process, in which case, the process is complete. If the omitted element is an end tag, such as the </tr> tag above, the logic proceeds to a decision block 120 in FIG. 4A, which determines if a matching start tag corresponding to the omitted end tag has also been omitted. In the foregoing exemplary code portion, the matching start tag, <tr>, was omitted, so the result in decision block 120 would be yes, and the omitted end tag is left omitted, as provided by a block 122. The next omitted tag is then evaluated, if applicable. As a result, omitted start end tag pairs are left omitted, thereby preserving the stylistic appearance of the omitted elements when the original document is saved in the HTML editor.

If the result in decision block 120 is no, the logic proceeds to a decision block 124, which determines if the element is the type of element that normally omits its end tag. Commonly used tags of this type include image tags (<img>), meta tags (<meta>) and line break tags (<br>). If the answer to decision block 124 is yes, the omitted end tag is left omitted, in accord with normal grammar rules for these types of elements, as provided by a block 126. If the result in decision block 124 is no, the original document is considered to have been created using non-standard grammar rules, as indicated by a block 128, and, accordingly, further processing of the omitted end tag is required, beginning with a decision block 130 in FIG. 4B.

Decision block 130 determines if the omitted tag is a structural tag or an object tag. The response to decision block 130 is obtained by looking to rule table 18, in which each tag is defined to be either a structural tag (e.g., table tags, paragraph tags, list tags), an object tag (e.g., image tags, applets, activeX objects), a spanning tag (e.g., font definition tags (<b> (bold), <i> (italic), etc.)), or head tags (e.g., title tags, meta tags, style tags). If the result in decision block 130 is yes, the logic will look ahead to the end of the containing structure for the current element for any text or other objects that have been added during an edit session, as provided by a block 132. For example, the logic will examine elements between the omitted tag currently being evaluated and an end tag corresponding to its parent tag (e.g., an end table tag </table> for a child tag within a table structure).

In a decision block 134, the logic determines if there was any text or another object found between the current element and its end parent tag. For example, suppose an original document only included the following text, <b> Hello in which the </b> tag is omitted. As discussed above, in this situation, a </b> tag is implicitly added by the browser after the word "Hello" during pre-rendering of the document, so the omission of the </b> tag does not present a problem. Now suppose a user adds the word "World" in normal (i.e., unbolded) format in the HTML editor's wysiwyg environment after the word "Hello." Since the end of the containing structure is the end of the document in this case, and the user has added text between the omitted element currently being evaluated (the </b> tag) and the end of document, the response in decision block 134 is yes, and the </b> tag is explicitly written out in a block 136, as follows.

<b> Hello </b> World

Processing of the </b> element is thus completed, and the logic returns to loop start block 112 to begin processing the next omitted tag, as applicable. If the result in decision block 134 is no, the element is left omitted in the document, as provided by a block 138, and the logic proceeds to evaluate the next element, as applicable.

If the element is not a structural or object tag, the result in decision block 130 is no, and the logic proceeds to a decision block 140, in which the logic determines if the omitted tag is a spanning tag. As discussed above, spanning tags include font definition tags such as <b> and <i>. These tags are termed spanning tags because they can "span" across various types of start end tag pairs. If the response to decision block 140 is yes, the logic proceeds to a decision block 142, which determines if the tag is contained inside a span-blocking tag. An example of a span blocking tag is the <td> tag. Spanning tags such as <b> and <i> do not span across table cells. In order to use a bold or italic font within a table structure, there must be a corresponding <b> or <i> tag disposed within the table structure. If the tag is contained inside a span-blocking tag structure, the logic looks ahead to the end of that span-blocking tag structure for any text or another object tag that has been added during the editing session in between the currently evaluated element and the end tag corresponding to the span-blocking structure, as provided by a block 144. If the answer to decision block 142 is no, the logic looks ahead to the end of the document for any text or another object tag that has been added during editing, as indicated by a block 146.

From either of blocks 144 and 146, the logic proceeds to a decision block 148, in which it determines if any text or another object was found in the portion of the document that was "looked ahead to." If the result is yes, an end tag corresponding to the current omitted end tag is explicitly written, as provided by a block 150, and the logic proceeds to evaluate the next element, as applicable. If the response to decision block 148 is no, the document is not altered, and the omitted end tag remains implicit, as provided by a block 152.

If the omitted end tag is not a structural, object, or spanning tag, the only other type of element the element could be is ahead tag, such as a <title> tag or a <style> tag, as indicated by a block 154. Accordingly, the logic looks ahead to the end of the document in a block 156 for anything later that would cause the document to be rendered differently if the omitted end tag remains omitted. For example, suppose an entire original document comprises the following.

<title>
    Hello

In the foregoing example, the </title> tag is implicitly added by the browser during pre-rendering. Now suppose the user wants to add the word "World," but not in the document title. Accordingly, a </title> tag must be added after the word "Hello," as follows.

<title>
    Hello
</title>
    World

In accord with a decision block 158, if there is anything later that is identified (such as the word "World" in this example) that would alter the way a document is rendered if the omitted tag remains omitted, an end tag corresponding to the omitted tag is explicitly written, in a block 160, e.g., the </title> tag above. In effect, decision block 158 will catch anything at all that is not implied, including other tags, and even comments. If nothing requiring the end tag is found later in the document, the omitted end tag is left omitted, as provided by a block 162. At the completion of either blocks 160 or 162, the logic proceeds to evaluate the next omitted tag, as applicable.

While the present invention has been described above in connection with its application to an HTML editor, it should be apparent that, the invention is also applicable to other types of applications. For example, it can be included in almost any software where objects (or attributes associated therewith) that are included in a file may be changed when the file is opened in an environment different that that in which the file was created. For example, as noted previously, it is common for new versions of a word processing program to include functions that were not recognized in earlier versions of the word processing program. Simply opening a file created in the new version of the word processing program in an older version should not cause loss of the attributes associated with the objects having such new functions, i.e., should not preclude those objects and their new functions from being implemented when the file has been saved in the older program and then subsequently reopened in the newer version of the word processing, program. Application of the present invention can prevent this undesirable result. In addition, the present invention is useful in systems for developing software programs, since a newer version of such a system may provide for objects and/or attributes that are not recognized in an earlier version of the system. It will be apparent that it is important to preserve such objects and their attributes if a file created in a newer version is opened in an older version of the system and then saved, so that subsequently, when the file is opened in the newer version of the programming system, it will still include the new objects and/or their new attributes.

The logic employed for preserved elements and attributes in an HTML document is generally applicable to maintain a persistent object stream when a file is opened in a different environment from that in which it was originally created. Those of ordinary skill in the art will readily appreciate how the flowcharts discussed above can be modified to apply to the more general case to which the present invention is also applicable, including language development systems and databases, particularly object oriented databases, where the attributes of an object that are recognized in a later version are preserved when a file containing the object is opened in an earlier version of the programming system, database program, or other environment that does not recognize the attributes of the object. FIG. 5 defines the steps employed when saving a file that has been opened in a different environment from that in which it was originally created. These steps will be observed to closely parallel those discussed above in connection with FIGS. 3A–3D.

In FIG. 5, the present invention provides for working through the objects that should persist in the file, writing each in turn to the file being stored, e.g., on a hard disk or other memory media. A decision block 170 determines if the current object is original, so that the object is represented by a substring referencing its original text and its attributes. If not, the object is likely new, and a block 172 provides for writing the object from scratch to the memory media, using a normal or default output routine to determine the attributes that should be saved with the object. These attributes will be those recognized by the environment in which the file is being saved. A block 174 provides for looping through the document or file until all elements have been processed.

Assuming that the current object is one that was originally in the file when it was first opened, a decision block 176 determines if the object's name or the attributes to which it relates have been changed since the file was opened. If not, a block 178 provides for writing out the original text or other attributes of the object without any change. Again, the process would loop back through the file or document to identify any other elements that need to be processed, as indicated in block 174.

A positive response to decision block 176 leads to a block 180 in which an editable copy is created from the original object and used to hold the attributes of the original object. The user can selectively add, remove, or change these attributes to generate a new copy of attributes for the object. In the event that the name of the object has been changed since the file or document was originally opened, a block 182 provides for updating the object name. A block 184 provides for removing data saved in a substring or any attributes that have been removed from the file since it was opened.

In a block 186, the data for the object currently being processed are updated to reflect any new attributes, or existing attributes of the object that have been changed. Using the updated or added data for the object, a new version of the object is then written to the file to reflect changes made while the file was opened in a block 190. Again, in accord with block 174, after all the elements in the document or file have been processed, the procedure is complete.

Personal Computer System Suitable for Implementing the Present Invention

FIG. 6 and the following discussion are intended to provide a brief, general description of a suitable computing environment in which the present invention may be implemented. Although not required, the present invention will be described in the general context of computer executable instructions, such as program modules, being executed by a personal computer. Generally, program modules include routines, programs, objects, components, data structures, etc. that perform particular tasks or implement particular abstract data types. Moreover, those skilled in the art will appreciate that this invention may be practiced with other computer system configurations, including hand held devices, multiprocessor systems, microprocessor based or programmable consumer electronic devices, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the invention includes a general purpose computing device in the form of a conventional personal computer 220, provided with a processing unit 221, a system memory 222, and a system bus 223. The system bus couples various system components, including the system memory, to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that helps to transfer information between elements within the personal computer 220, such as during start up, is stored in, ROM 224. Personal computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231, such as a CDROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. The drives and their associated computer readable media provide nonvolatile storage of computer readable machine instructions, data structures, program modules, and other data for personal computer 220. Although the exemplary environment described herein employs a hard, disk, removable magnetic disk 229, and removable optical disk 231, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 229, optical disk 231, ROM 224 or RAM 225, including an operating system 235, one or more application programs 236, other program modules 237, and program data 238. A user may enter commands and information into personal computer 220 through input devices such as a keyboard 240 and a pointing device 242. Other input devices (not shown) may include a microphone, joystick, game pad, satellite dish, scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or a universal serial bus (USB). A monitor 247 or other type of display device is also connected to system bus 223 via an appropriate interface, such as a video adapter 248. In addition to the monitor, personal computers are often coupled to other peripheral output devices (not shown), such as speakers (through a sound card or other audio interface—not shown) and printers.

Personal computer 220 may operate in a networked environment using logical connections to one or more remote computers, such as a remote computer 249. Remote computer 249 may be another personal computer, a server, a router, a network personal computer, a peer device, or other common network node, and typically includes many or all of the elements described above in connection with personal computer 220, although only an external memory storage device 250 has been illustrated in FIG. 21. The logical connections depicted in FIG. 21 include a local area network (LAN) 251 and a wide area network (WAN) 252. Such networking environments are common in offices, enterprise wide computer networks, intranets and the Internet.

When used in a LAN networking environment, personal computer 220 is connected to LAN 251 through a network interface or adapter 253. When used in a WAN networking environment, personal computer 220 typically includes a modem 254, or other means for establishing communications over WAN 252, such as the Internet. Modem 254, which may be internal or external, is connected to the system bus 223, or coupled to the bus via I/O device interface 246, i.e., through a serial port. In a networked environment, program modules depicted relative to personal computer 220, or portions thereof, may be stored in the remote memory storage device. These program modules include machine instructions, which when executed by processing unit 221, cause the functions described above to be implemented in accord with the present invention. It will be appreciated that the network connections shown are exemplary and other means of establishing a communications link between the computers may be used.

Although the present invention has been described in connection with the preferred form of practicing it and modifications thereto, those of ordinary skill in the art will understand that many other modifications can be made to the present invention within the scope of the claims that follow. Accordingly, it is not intended that the scope of this invention in any way be limited by the above description, but instead be determined entirely by reference to the claims that follow.

The invention in which an exclusive right is claimed is defined by the following:

1. A method for preserving attributes of original objects in a file when the file is opened in a different environment than that in which the file was originally created, comprising the steps of:
 (a) defining a set of preservation rules defining how objects and associated attributes are to be preserved in the different environment;
 (b) temporarily storing attributes of any original objects included in the file when the file is opened in the different editing environment in a manner that links each object to any associated attributes;
 (c) enabling changes to be made to the file, said changes being temporarily stored in the different editing environment; and
 (d) writing a revised file to a temporary file and/or a persistent medium, said revised file including the original objects and their associated attributes, and any new object and any attributes associated with said any new object resulting from changes made to the file, said file preserving the attributes of the original objects remaining in the revised file based on preservation rules corresponding to the original objects and their attributes.

2. The method of claim 1, wherein at least some of the attributes for at least some of the original objects define a stylistic format for a document corresponding to the file, said stylistic format defined by the attributes for any original objects remaining being preserved when the revised file is written.

3. The method of claim 1, wherein a specific object that is one of the original objects in the file comprises text and an attribute associated with said object defines a whitespace around the object, data corresponding to said object and its associated attribute being temporarily stored in a data structure that is linked to the object.

4. The method of claim 3, wherein the set of preservation rules is stored in a lookup table, and wherein any preservation rules that are to be applied to preserve any attributes corresponding to said object are determined as a function of the data stored in the data structure corresponding to the object.

5. The method of claim 3, wherein the whitespace includes at least one of an indent level and a line spacing applied to the text of the object.

6. The method of claim 1, wherein the set of preservation rules include rules for handling stylistic formats associated with new objects added to change the file, further comprising the step of applying the rules for handling the stylistic formats associated with any new objects to determine the stylistic format for a new attribute associated with each new object that has been added to change the file, each new attribute being written to the revised file.

7. The method of claim 1, further comprising the step of parsing the file to identify the original objects and the attributes associated with each original object, producing internal representations of the original objects and their attributes that are temporarily stored while the file is open in the different environment.

8. The method of claim 1, wherein the original objects include a tag element having attributes that defines leading and trailing whitespace for the tag element.

9. The method of claim 8, wherein the trailing whitespace for the tag element is used to determine an indent level for a subsequent object in the file.

10. The method of claim 1, further comprising the step of automatically determining a set of rules to apply in formatting, for new objects added to the file, so as to be consistent with the attributes of the original objects.

11. The method of claim 1, further comprising the step of merging the attributes of any new object added by the changes made to the file with the attributes of the original objects, based on formatting criteria defined by a set of predefined formatting rules.

12. The method of claim 1, wherein the file corresponds to a markup language document that is rendered by a browser to produce a display page, further comprising the steps of:
 (a) identifying any omitted objects in the markup language document that are implicitly added by the browser to produce the display page; and
 (b) leaving omitted the original objects that are identified as omitted objects in the revised file, unless omission of one or more of such omitted objects would cause the display page to appear differently than if said one or more of omitted objects were present in the revised file, and, if so, explicitly adding said one or more omitted objects to the revised file.

13. A computer-readable medium having computer-executable instructions for performing the steps recited in claim 1.

14. A method for preserving attributes of original elements in a document written in a programming language when the document is opened in a different environment than that in which the document was originally created, comprising the steps of:
(a) parsing the document to identify each original element and its associated attributes and temporarily storing information concerning each original element that is identified and its associated attributes, when the document is opened in the different environment;
(b) enabling changes to be made to the document, including adding new, elements and any attributes corresponding to the new elements to the document, said changes being temporarily stored in the different environment;
(c) merging the attributes of any new elements added by the changes made to the document with the attributes of the original elements, to produce an internal representation of a revised document; and
(d) saving the revised document to a temporary file and/or in a persistent format, said revised document being saved so as to preserve the attributes of the original elements and so as to include any new elements and corresponding attributes that were added in accord with any changes made to the document.

15. The method of claim 14, wherein the document includes a plurality of language elements arranged in an overall stylistic layout when it is first opened in the different environment, said overall stylistic layout being preserved when the document is saved in the different environment.

16. The method of claim 14, wherein the plurality of language elements in the document include text entries having whitespace attributes, and wherein a whitespace attribute that is associated with a text entry is preserved in the document unless changed while the document is open in said different environment.

17. The method of claim 14, wherein the plurality of language elements in the document include tag entries having whitespace attributes, and wherein a whitespace attribute associated with a tag entry is preserved in the document when it is saved unless changed while the document is open.

18. The method of claim 14, wherein any original element that is unrecognized in the different editing environment is preserved along with any attributes associated with the original element that is unrecognized, when the document is saved, unless said original element that is unrecognized and its associated attributes are removed while the document is open.

19. The method of claim 14, wherein the document, when initially opened in the different environment, comprises an original internal representation corresponding to an environment in which the document was originally created, said document being saved in the different environment so as to have a different internal representation than the original internal representation.

20. The method of claim 14, further comprising the steps of:
(a) determining the attributes of specific original elements when the document was opened; and
(b) applying attributes for any related new elements that are added to the document while the document is changed, so that the attributes of the related new elements are consistent with the attributes of the specific original elements.

21. The method of claim 14, wherein the step of saving the document comprises the steps of:
(a) defining a set of preservation rules defining how different elements and attributes associated with those different elements are to be preserved upon saving the document; and
(b) writing each element in the document and any attributes associated with the element to the document when it is saved based upon any preservation rules that are applicable to the element and/or to its associated attributes.

22. The method of claim 14, wherein the document is written in a markup programming language that enables the document to be rendered by a browser, and wherein elements in the document include text entries having whitespace attributes, further comprising the step of removing a whitespace attribute that is associated with a specific text entry so that the specific text entry and any elements related to the specific text entry are arranged in accordance with a predefined stylistic format, so long as removal of the whitespace attribute does not alter how the document is rendered by the browser.

23. The method of claim 14, wherein the document is written in a markup programming language and the original elements comprise markup language tags, and further wherein the document is rendered by a browser to produce a display page, further comprising the steps of:
(a) identifying any omitted markup language tags in the document that are implicitly added by the browser to produce the display page; and
(b) leaving omitted any omitted markup language tags that are identified in the revised document, unless omission of one or more of such omitted markup language tags would cause the display page to appear differently than if said one or more of omitted markup language tags were present in the revised document, and if so, explicitly adding said one or more omitted markup language tags to the revised document.

24. A computer-readable medium having computer-executable instructions for performing the steps recited in claim 14.

25. A system for preserving attributes of original objects in a file when the file is opened in a different environment than that in which the file was originally created, comprising:
(a) a memory adapted to store data and machine instructions, said data including data defining a set of preservation rules corresponding to how various objects and associated attributes are to be preserved in the different environment;
(b) a processor coupled to the memory, said processor controlling storage of the data in the memory and executing the machine instructions to implement a plurality of functions;
(c) a display on which graphics and text are presented to a user in accord with the machine instructions, said display being controlled by the processor; and
(d) a user input device adapted to enable the user to input data and to control the processor, said plurality of functions implemented by the processor including:
(i) temporarily storing attributes of any original objects included in the file when the file is opened in the different editing environment in a manner that links each original object to its associated attributes;

(ii) enabling changes to be made to the file, including adding new objects and any attributes associated with said new objects to the file, said changes being temporarily stored in the different editing environment; and (iii) writing a revised file to a temporary file and/or a persistent medium, said revised file including the original attributes and their associated attributes and any new objects and attributes associated with said new objects added in accord with any changes made to the file, said revised file preserving the attributes of the original objects remaining in the revised file based on preservation rules from the set that correspond to those original objects and their attributes.

26. The system of claim 25, wherein the original objects in the file include text entries having whitespace attributes, and wherein a whitespace attribute that is associated with a text entry is preserved in the revised file unless changed while the file is open in said different environment.

27. The system of claim 25, wherein the original objects in the file include tag entries having whitespace attributes, and wherein a whitespace attribute associated with a tag entry is preserved in the revised file unless changed while the file is open in said different environment.

28. The system of claim 25, wherein objects in any class that is unrecognized in the different environment are ignored while the file is open in the different environment, but are merged with recognized objects when the revised file is written.

29. The system of claim 25, wherein the machine instructions further cause the processor to merge the attributes associated with any new objects added to the file, with the attributes associated with the original objects based on a format style for the attributes associated with the original objects.

30. The system of claim 25, wherein the file has an original internal representation in the environment in which it was created, and wherein the machine instructions further cause the processor to parse the file to identify the original objects and their associated attributes, and to create a different internal representation of the original objects and their associated attributes upon writing the revised file.

31. The system of claim 25, wherein the machine instructions further cause the processor to determine attributes associated with specific original objects when the file was open and to apply said attributes to any related new objects that are added to the file while the file is open, so that attributes associated with the related new objects are consistent with those of said specific original objects.

32. The system of claim 25, wherein the file is written in a markup programming language and the original objects include markup language tags, and further wherein the document is rendered by a browser to produce a display page, the machine instructions further causing the processor to perform the functions of:

(a) identifying any omitted markup language tags in the file that are implicitly added by the browser to produce the display page; and (b) leaving omitted any omitted markup language tags that are identified in the revised file, unless omission of one or more of such omitted markup language tags would cause the display page to appear differently than if said one or more of omitted markup language tags were present in the revised file, and if so, explicitly adding said one or more omitted markup language tags to the revised file.

* * * * *